(12) United States Patent
Dachis et al.

(10) Patent No.: US 9,251,530 B1
(45) Date of Patent: Feb. 2, 2016

(54) APPARATUS AND METHOD FOR MODEL-BASED SOCIAL ANALYTICS

(75) Inventors: Jeffrey Dachis, Austin, TX (US); Erik Lee Huddleston, Austin, TX (US); Brian Justin Huddleston, II, Austin, TX (US); Steven Michael Vaughan, Austin, TX (US); Roger Louis Cauvin, Austin, TX (US); John Joseph De Oliveira, Austin, TX (US); William Lance Eason, Austin, TX (US); Jeremy Hanna, Austin, TX (US); Shannon Paul Hardt, Austin, TX (US); Bryan Joseph Horne, Austin, TX (US); Brandon Kearby, Austin, TX (US); Clinton Frederick Miller, Austin, TX (US); Jacob Andrew Perkins, Austin, TX (US); Timothy Joseph Potter, Austin, TX (US); Ramon Renteria, Austin, TX (US); Jason Samuel Westigard, Austin, TX (US); David Chi-Fine Yu, Austin, TX (US)

(73) Assignee: SPRINKLR, INC., New York, NY (US)

( * ) Notice: Subject to any disclaimer, the term of this patent is extended or adjusted under 35 U.S.C. 154(b) by 461 days.

(21) Appl. No.: 13/601,151

(22) Filed: Aug. 31, 2012

(51) Int. Cl.
*G06F 17/30* (2006.01)
*G06F 15/16* (2006.01)
*G06Q 30/00* (2012.01)
*G06Q 30/02* (2012.01)

(52) U.S. Cl.
CPC ............ *G06Q 30/0242* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,729,637 A | 3/1998 | Nicholson et al. | |
| 7,328,242 B1 | 2/2008 | McCarthy et al. | |
| 7,899,871 B1 | 3/2011 | Kumar et al. | |
| 8,583,747 B2 | 11/2013 | Buchheit et al. | |
| 8,606,792 B1 | 12/2013 | Jackson | |
| 8,620,718 B2* | 12/2013 | Varghese et al. | 705/7.29 |
| 2009/0018996 A1* | 1/2009 | Hunt et al. | 707/2 |
| 2009/0281870 A1* | 11/2009 | Sun | G06Q 10/10 705/7.29 |
| 2009/0327972 A1 | 12/2009 | McCann et al. | |
| 2010/0064017 A1 | 3/2010 | Buchheit et al. | |
| 2010/0119053 A1* | 5/2010 | Goeldi | 379/265.09 |
| 2011/0145064 A1* | 6/2011 | Anderson et al. | 705/14.53 |
| 2011/0213670 A1* | 9/2011 | Strutton et al. | 705/14.73 |
| 2011/0231240 A1* | 9/2011 | Schoen et al. | 705/14.41 |
| 2011/0282943 A1* | 11/2011 | Anderson et al. | 709/204 |
| 2012/0123924 A1* | 5/2012 | Rose et al. | 705/35 |
| 2012/0143700 A1* | 6/2012 | Bhattacharya et al. | 705/14.72 |

(Continued)

OTHER PUBLICATIONS

Dachis et al., Social Business Design, Business Journal, Oct. 5, 2009, pp. 1-16.

(Continued)

*Primary Examiner* — Ario Etienne
*Assistant Examiner* — Ho Shiu
(74) *Attorney, Agent, or Firm* — Schwabe, Williamson & Wyatt

(57) ABSTRACT

A model based social analytic system collects social signals from social network accounts for different companies and constituents. The social signals can be used to benchmark social network performance for different contextual dimensions, such as industries, companies, brands, etc. Conversations may be identified in the signals and the types of constituents participating in the conversations may be identified. Analytics can then be determined for the contextual dimensions based on the related conversations and the types of constituents participating in the conversations.

24 Claims, 24 Drawing Sheets

(56) References Cited

U.S. PATENT DOCUMENTS

| | | | |
|---|---|---|---|
| 2012/0185544 A1* | 7/2012 | Chang et al. | 709/206 |
| 2012/0239761 A1 | 9/2012 | Linner et al. | |
| 2012/0278329 A1 | 11/2012 | Borggaard et al. | |
| 2012/0290446 A1* | 11/2012 | England | G06Q 30/0282 705/27.1 |
| 2013/0014136 A1* | 1/2013 | Bhatia et al. | 725/9 |
| 2013/0018968 A1 | 1/2013 | Pennacchiotti | |
| 2013/0073387 A1* | 3/2013 | Heath | 705/14.53 |
| 2013/0073389 A1* | 3/2013 | Heath | 705/14.54 |
| 2013/0073400 A1* | 3/2013 | Heath | 705/14.73 |
| 2013/0073473 A1* | 3/2013 | Heath | 705/319 |
| 2013/0132437 A1 | 5/2013 | Park et al. | |
| 2013/0204823 A1 | 8/2013 | Treiser | |
| 2013/0273976 A1 | 10/2013 | Rao et al. | |
| 2013/0275352 A1 | 10/2013 | Servi et al. | |
| 2013/0304726 A1 | 11/2013 | Sandulescu et al. | |
| 2013/0304819 A1 | 11/2013 | Oane et al. | |
| 2013/0339021 A1* | 12/2013 | Deshmukh et al. | 704/257 |
| 2014/0330632 A1 | 11/2014 | Huddleston | |

OTHER PUBLICATIONS

Vinciarelli, Alessandro, et al.; Image and Vision Computing "Social signal processing: Survey of an emerging domain"; journal homepage: www.elsevier.com/locate.imavis; Sep. 26, 2008; pp. 1743-1759 (17 pages).

* cited by examiner

NORMALIZED SOCIAL DATA — 380

| FROM | TO | SOURCE | DATE/TIME | SIGNAL_ID | SIGNAL TYPE | CONTENT |
|---|---|---|---|---|---|---|
| BIZ_A | | SN_104A | 12/10/12 8:45A | SIGNAL#1 | POST | "CHECK OUT OUR NEW PHONE" |
| CONSTITUENT_A | | SN_104B | 12/10/12 10:45A | SIGNAL#2 | TWEET | "NEW PHONE IS GREAT" |
| CONSTITUENT_B | CONSTITUENT_A | SN#104B | 12/13/12 7:15P | SIGNAL#3 | RETWEET | "I DON'T LIKE NEW PHONE" |
| 382A | 382B | 382C | 382D | 382E | 382F | 382G |

FIG. 13

NORMALIZED SOCIAL DATA ── 380

SIGNAL_ID: UNIQUE SIGNAL IDENTIFIER

TIME: TIME SIGNAL WAS GENERATED

TIME BUCKET: MONITORED TIME PERIOD ASSOCIATED WITH SIGNAL

SIGNAL TYPE: POST, REPLY, ECHO

CONTENT TYPE: TWEET, WALL POST, BLOG, FORUM, VIDEO, COMMENT, PHOTO

SERVICE ACCOUNT ID: IDENTIFIER OF ACCOUNT THAT ORIGINATED THE SIGNAL

ECOSYSTEM ACCOUNT ID: IDENTIFIER ASSIGNED TO THE ANALYTIC SYSTEM ACCOUNT FOR THE ECOSYSTEM CONTAINING THIS SIGNAL

SERVICE: TWITTER, FACEBOOK, YOUTUBE, ETC.

URL: URL TO THE SIGNAL

PARENT SIGNAL ID: IDENTIFIER OF ORIGINAL SIGNAL FOR REPLY OR ECHO SIGNAL

TAGS: HASH TAGS TAGGED TO THE SIGNAL

LINKS: URL LINKS EMBEDDED IN SIGNAL

CONTENT: CONTENT OF SIGNAL.

FIG. 14

ANALYSIS

> RATING: OVERALL RATING OF SIGNAL OR ACCOUNT
>
> SIGNAL COUNT: NUMBER OF SIGNALS IDENTIFIED FOR THE ACCOUNT FOR A PARTICULAR TIME PERIOD
>
> RATING_COUNT: NUMBER OF RATINGS ACCOUNT HAS RECEIVED
>
> LIKES: NUMBER OF TIMES THE SIGNAL WAS LIKED
>
> DISLIKES: NUMBER OF TIMES THE SIGNAL WAS DISLIKED
>
> FAVORITES: NUMBER OF TIMES THE SIGNAL FAVORITED
>
> IMPRESSIONS: NUMBER OF TIMES THE SIGNAL HAS BEEN VIEWED
>
> LISTINGS: NUMBER OF TIMES THE SIGNAL HAS BEEN ADDED TO A SIGNAL LIST
>
> MENTIONS: NUMBER OF TIMES AN ACCOUNT OR SIGNAL HAS BEEN MENTIONED
>
> SENTIMENT: A SENTIMENT SCORE BASED ON SENTIMENT CLASSIFIERS (NEGATIVE, NEUTRAL, POSITIVE)

APPARATUS AND METHOD FOR MODEL-BASED SOCIAL ANALYTICS

BACKGROUND

Social networks are used by businesses to advertise and market products. For example, a company may use a social network to announce the launch of a new product. Consumers then write blogs, send messages, etc. discussing and reviewing the new product. The product launch may be considered a success or a failure based on the social network interactions surrounding the new product. For example, the product launch may be considered a success when a large number of consumers generate a large number of positive social network reviews about the new product. The product launch may be considered a failure when there is little "buzz" surrounding the launch and only a small number of consumers generate a relatively small number of social network reviews. The product launch could also be considered a failure when a large number of negative reviews are generated about the new product.

Companies face a challenge monitoring and managing social network interactions regarding their products. For example, a large company may have millions of followers on their social networks that send or post millions of messages related to different products. Companies may not have the human resources to manually monitor and manage such large amounts of social network traffic.

Even if companies had the human resources to monitor related social network traffic, it would still be difficult to quantitatively measure the performance of social network marketing campaigns. For example, the marketing campaign may not necessarily be directed to increasing the sales of a specific product, but may be directed to increasing general product awareness. Reviewing a small window of subjective consumer comments sent over social networks may not provide the quantitative analytics needed to clearly determine the success of the product awareness marketing campaign.

BRIEF DESCRIPTION OF THE DRAWINGS

FIG. 13 depicts an example of normalized signal data.

FIG. 14 depicts examples of metadata extracted from the signals.

FIG. 18 depicts an example of metrics generated from the signals.

DETAILED DESCRIPTION

A model-based social analytic system collects social signals for an expansive range of different industries in accordance or consistent with applicable laws or terms. Analytics are derived from the social signals and used as benchmarks for comparing social network performance relative to particular industries, companies, brands, competitors, geographic regions, etc.

The model-based approach used by the social analytic system identifies unique relationships between different social network accounts and social signals. For example, the analytic system may identify conversations related to a particular topic or brand and may distinguish between different constituents participating in the conversations. The analytic system may then derive quantitative analytics for the different industries, companies, brands, geographic regions, etc. based on the related conversations and constituents. The social analytic system can more efficiently derive more accurate quantitative analytics by uniquely identifying and analyzing the social signals that are most relevant to the social network performance of a particular entity.

Figure 1:
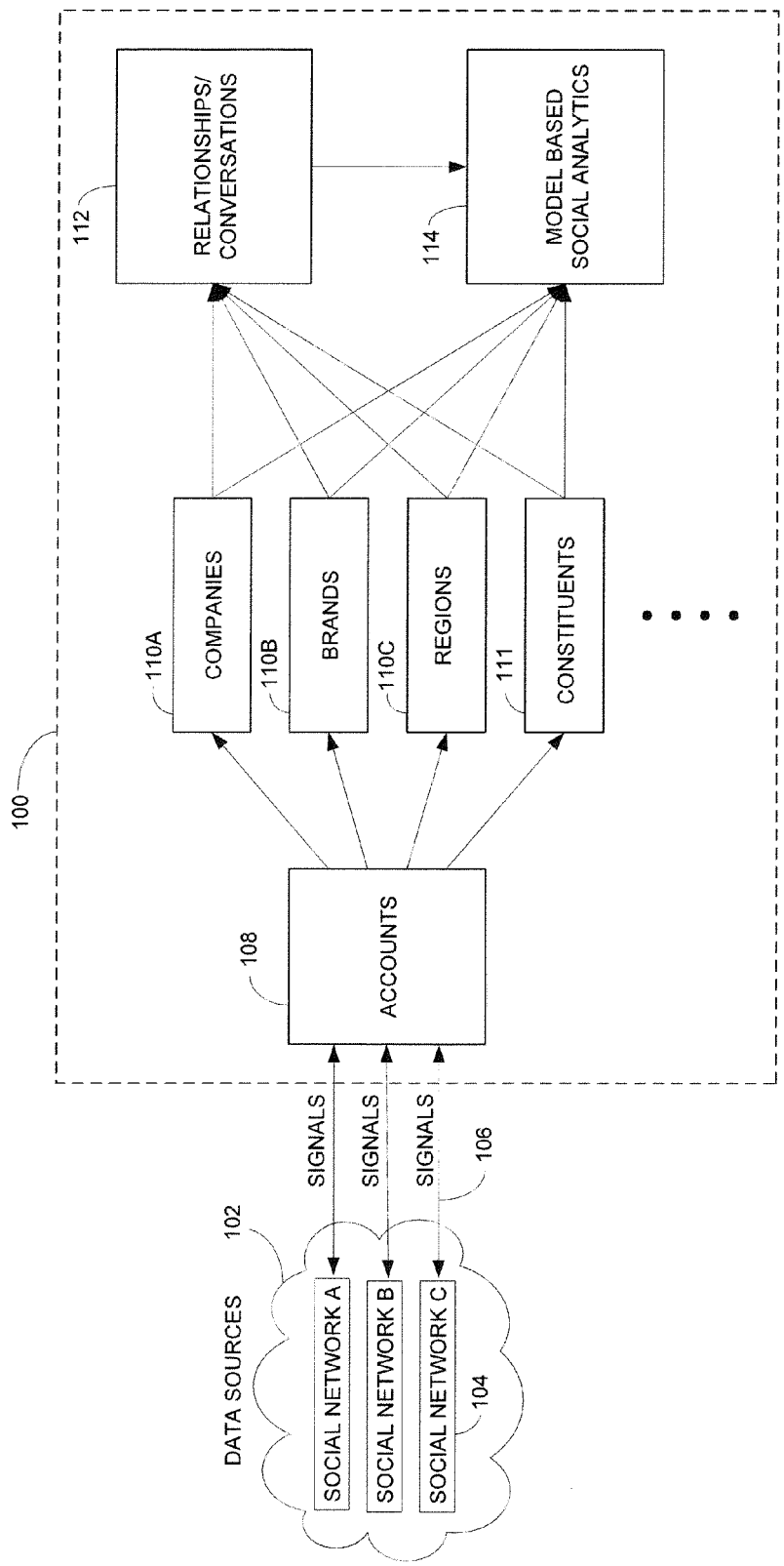
FIG. 1 depicts an example of a social analytic system.

FIG. 1 depicts an example of a model based social analytic system 100. In one example, data sources 102 may comprise one or more social networks 104, such as Twitter®, Facebook®, YouTube®, Google+®, or the like, or any combination thereof including pre-existing services that aggregate social sources (such as BoardReader®). However, data sources 102 may comprise any computing system or social network that generates or aggregates messages that may be exchanged or reviewed by different users.

Accounts 108 are stored within analytic system 100 and identify corresponding social network accounts within the social networks 104. In one example, accounts 108 may attempt to identify substantially all of the social network accounts for substantially every major company for a variety of different industries. Accounts 108 also may attempt to identify substantially all of the social network accounts for substantially all of the products marketed by each of the companies.

Any combination of computing devices, such as network servers and databases may operate within analytic system 100 and collect signals 106 from Application Programmer Interfaces (APIs) or other collection schemes, including collecting signals 106 from third parties. Signals 106 may contain content and/or metadata for messages sent or posted by the associated network accounts. For example, signals 106 may include the content of the message, the user account information for the social network sending the message, tags identifying the context of the message, a Universal Resource Locator (URL) for the message, a message type identifier, etc.

For explanation purposes, messages may refer to any communications exchanged via a social network 104 and any content or information that may be associated with the communication. For example, messages may comprise posts, blogs, Tweets, re-tweets, sentiment indicators, emails, text messages, videos, wall posts, comments, photos, links, or the like, or any combination thereof.

Accounts 108 and signals 106 may be associated with contextual dimensions, such as companies 110A, brands 110B, geographic regions 110C, etc. Similarly, the accounts 108 and signals 106 may be associated with different types of constituents 111, such as advocates, influencers, partners, detractors, or market participants. Values of contextual dimensions 110 may be identified a priori or may be determined from the message content or metadata in signals 106. For example, Universal Resource Locators (URLs) or hash tags within signals 106 may identify a particular brand 110B. In another example, the message content in signal 106 may include keywords that refer to brand 110B.

Constituents 111 may be based on the number and types of messages sent from the associated social network accounts and the metrics associated with the associated social network accounts. For example, a first constituent that sends or posts a large number of positive messages related to a particular company may be identified as an advocate of the company. A second constituent that has a relatively large number of followers may be identified as an influencer.

Analytic system 100 may identify different relationships 112 between different signals 106, between different accounts 108, and/or between different signals and different accounts. For example, analytic system 100 may identify different on-line conversations 112 associated with brand 110B. Signals 106 associated with conversations 112 about brand 110B may be assigned associated conversation identifiers.

Analytics system 100 then may generate different social analytics 114 for brand 110B based on the associated conversation 112 and constituents 110D participating in conversation 112. For example, analytic system 100 may generate a quantitative score for one of accounts 108 associated with brand 110B based on the strength of conversations 112 associated with brand 110B. The strength of conversations 112 may be based on the number of signals 106 and number and types of constituents 110 participating in the conversations 112 related to brand 110B.

Contextual dimensions 110, constituents 111, and relationships 112 allow analytic system 100 to derive quantitative performance scores for a wider variety of different definable entities. The modeling provided by contextual dimensions 110, constituents 111, and relationships 112 also allow more efficient and accurate social analytics generation by identifying and processing signals 106 most relevant to accounts 108.

Figure 2:
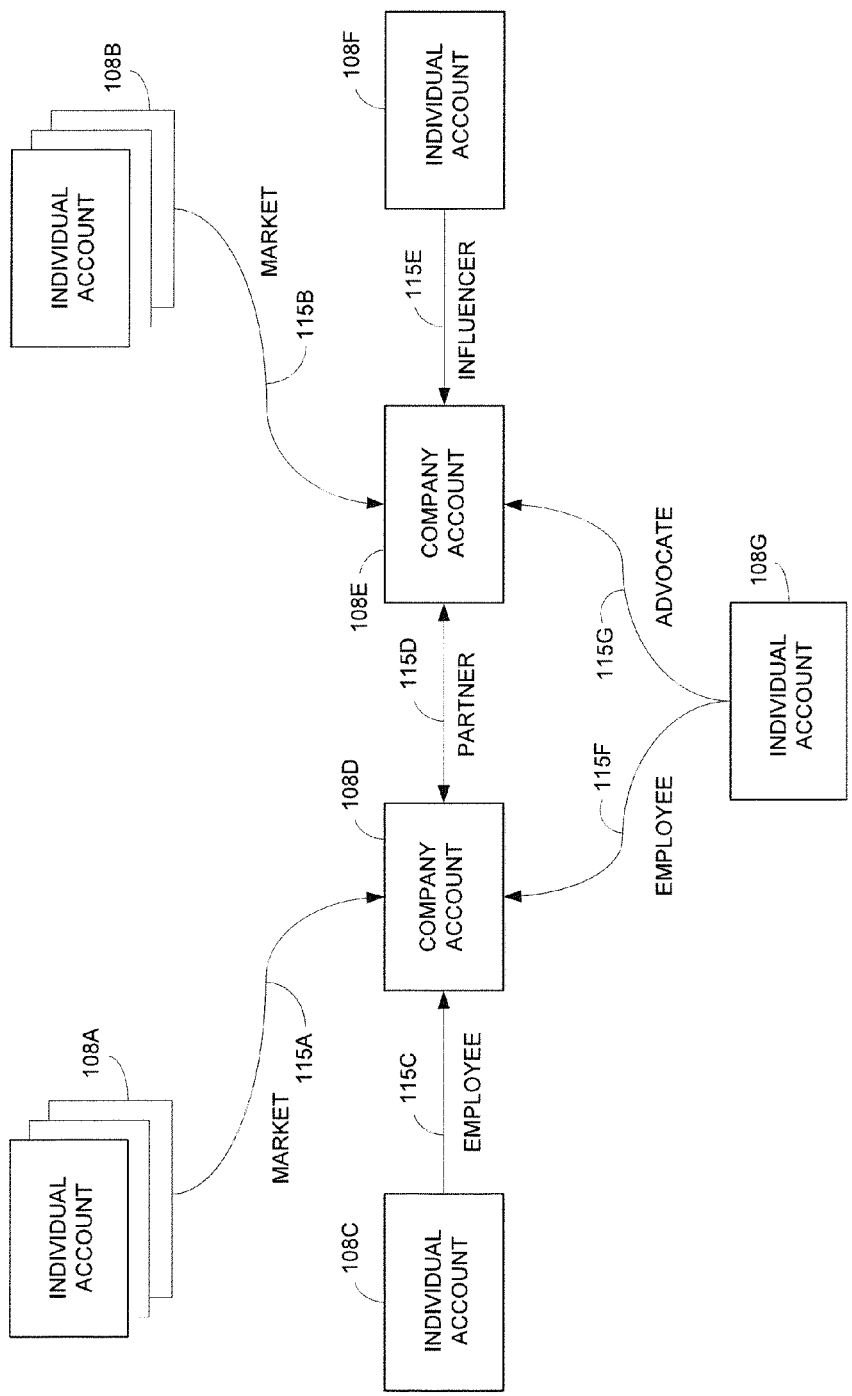
FIG. 2 depicts an example of how constituent relationships are associated with different accounts.

FIG. 2 depicts a conceptual diagram showing in more detail constituent relationships between different accounts. It should be understood that this is just one example of how social data may be modeled by the analytic system. Accounts 108D and 108E may represent social network accounts operated by companies. For example, a car company may operate account 108D. Accounts 108D and 108E may be identified by the analytic system as having a partner relationship. For example, account 108E may be a wholesale or retail company that sells cars for the car company operating account 108D.

Accounts 108A may represent social network accounts operated by individuals. For example, one of accounts 108A may be operated by a consumer that has purchased a vehicle from the car company associated with company account 108D. The analytic system may identify individual accounts 108A as having a market relationship 115A with company account 108D. For example, the analytic system may identify individual accounts 108A that have sent, posted, or viewed messages related to company account 108D. The analytic system may identify other individual accounts 108B that have market relationships 115B with company account 108E.

The analytic system also may identify employee relationships 115C between individual accounts 108C and company account 108. For example, individual accounts 108C may be operated by employees of the company operating company account 108D.

Individual account 108F may be identified as having an influencer relationship 115E with company account 108E. Similarly as for market relationships 115A and 115B, the analytic system may determine that account 108F generates messages, views messages, or has other types of interactions related to company account 108E.

However, individual account 108F may have a greater influence in the social network than individual accounts 108A and 108B having market relationships 115A and 115B, respectively. For example, individual account 108F may be identified as having a large number of followers or subscribers in the social network and therefore may be identified as having an influencer relationship 115E with company account 108E. The market relationships associated with individual accounts 108A and 108B may have been determined to have a fewer number of followers or subscribers that personal accounts with influencer relationships.

Individual account 108G may be identified as having both an employee relationship 115F with company account 108D and an advocate relationship 115G with company account 108E. For example, individual account 108G may be operated by an individual employed by the company operating company account 108D. The employee also may send or post a large number of messages about the company operating company account 108E. The analytic system may determine that the messages generated by individual account 108G related to company account 108E have an overall positive sentiment. Accordingly, the analytic system may identify an advocate relationship 115G between individual account 108G and company account 108D.

Advocate relationships 115G may be different from influencer relationships 155E. Influencer relationships 115E may have some a large number of interactions with different accounts but may not necessarily have a large number of interactions specifically with company account 108E. For example, individual account 108F may send or post a large number of messages about a large number of topics, but not necessarily send or post a large number of messages to or about company account 108E. However, as mentioned above, individual account 108F may have a relatively large number of followers. On the other hand, individual account 108G having advocate relationship 115G may send or post a relatively large number of positive messages to or about company account 108E. However, individual account 108G may have a relatively small number of followers or subscribers.

Distinguishing between influencer relationships and advocate relationships may provide valuable analytics for the company operating company account 108E. For example, the company may want to increase or direct more social network interactions or attention to individual account 108F (influencer account) in order to persuade the individual operating individual account 108F to start sending or posting more positive messages about the company.

These directed interactions with individual account 108F may result in a larger positive impact on the social network rating for company account 108E than increasing interactions with individual accounts 108A or 108B (market accounts) or individual account 108G (advocate account). Individual account 108F has been determined to have a relatively large number of subscribers. Therefore, causing individual account 108F to generate more positive messages about company account 108E may have a relatively large positive impact within the social network.

The analytic system has already determined that advocate account 108G generates a relatively large number of positive messages related to company account 108E and has also determined that individual account 108G has fewer followers than individual account 108F. Thus, increasing interactions with individual account 108G may not substantially increase the number of positive messages generated by individual account 108G, increase the number of other social network participants viewing positive messages regarding company account 108E, or increase in the overall social network performance of company account 108E.

Figure 3:
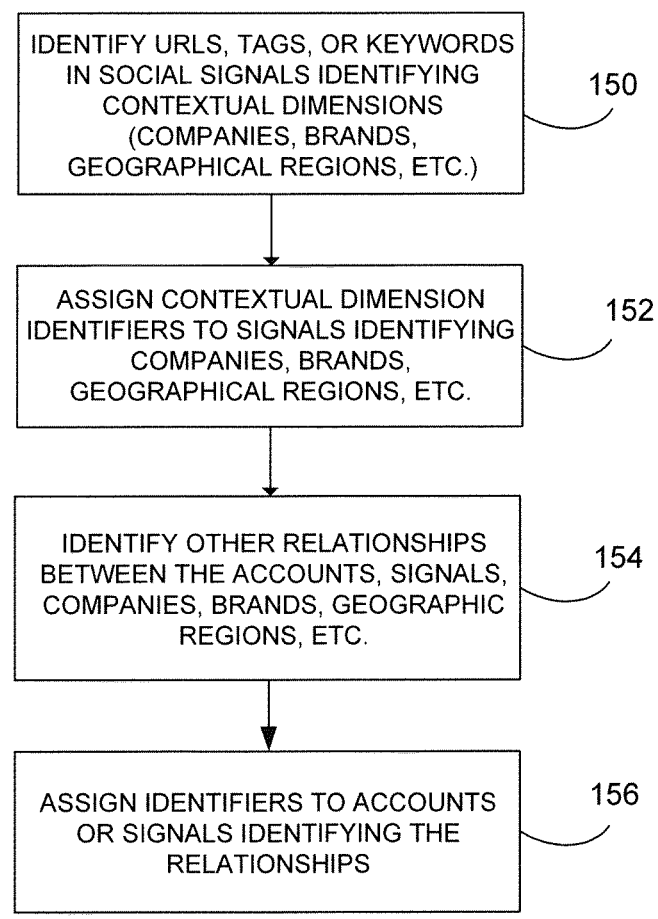
FIG. 3 depicts an example of how contextual dimensions and relationships are identified for different accounts and signals.

FIG. 3 depicts one example of a process for identifying and assigning contextual dimensions to accounts and/or signals and identifying other relationships between the contextual dimensions and other accounts and signals. In operation 150, the analytic system may identify metadata in the signals identifying different contextual dimensions. For example, the signal may include a URL that identifies a particular company, brand, and/or geographic region. For example, the URL may have the following format:

http://www.social_network.com/company/brand.

The signals may contain other tags that identify the contextual dimension. For example, the signal may include a mention field, hash tag, etc. that identifies the company or brand related to the associated message content. In operation 152, the analytic system may assign a unique contextual dimension identifier to the signal identifying the company or brand.

Alternatively, the analytic system in operation 150 may identify keywords in the content of the signals that identify the associated contextual dimension. For example, a user of an account may post or send a message that discusses a particular company, brand, etc. The analytic system may compare keywords in the message with keyword topic clusters associated with the company and/or brand. In operation 152, signals may be assigned contextual dimension identifiers associated with the matching keyword topic clusters.

In operation 154, the analytic system may identify other relationships between the accounts, signals, and/or contextual dimensions. For example, the analytic system in operation 154 may identify the types of constituents associated with the signals. For example, a company X may send or post a message about one of their brands Y. In operation 152, the analytic system may assign a first identifier to the signal identifying the contextual dimension for the signal as brand Y and in operation 156 may assign a second identifier to the signal identifying company X as the sender or poster of the message.

In another example, an employee of company X may send or post a message about brand Y. The analytic system in operation 152 may assign a first identifier to the signal identifying a contextual dimension for the signal as relating to brand Y and in operation 156 assign a second identifier to the signal identifying the sender or poster of the message as an employee of company X. The employee relationship between the signal and brand Y may be determined a priori from information provided by the company or may be determined by the analytic system from the URL for the signal that may indicate the signal was sent from an employee account for company X.

In yet another example, a message may be sent or posted from an account that is not directly associated with company X. For example, a consumer may send or post a message related to brand Y. In operation 154, the analytic system may identify the relationship between the consumer account and the company X based on the number and/or types of signals generated from the consumer account. As explained above, the analytic system may identify the consumer account as an advocate of the company X account when the consumer account generates a large number of positive sentiment messages related to company X.

Figure 4:
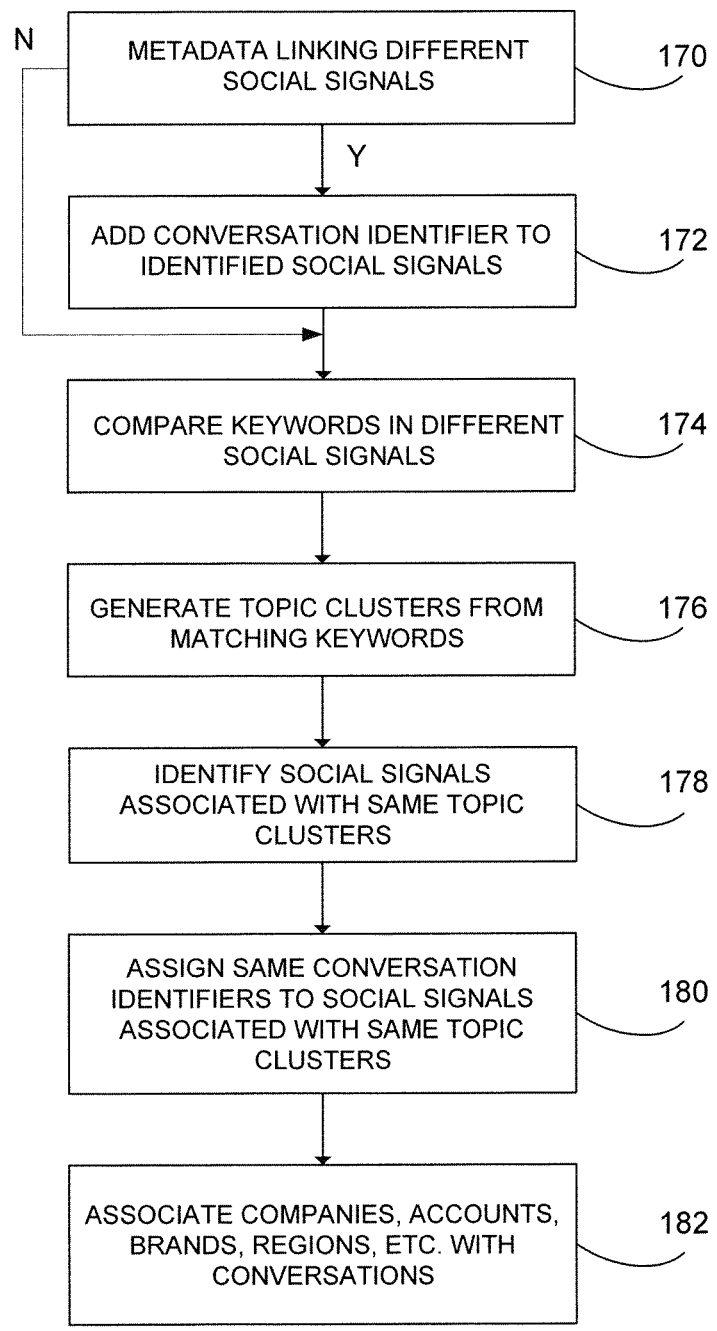
FIG. 4 depicts an example of how a conversation is associated with an account.

FIG. 4 depicts in more detail one example of how signals are associated with a same conversation. Users of social networks may conduct conversations regarding different topics. For example, a user may send or post messages regarding the release of a new film. Other users then may respond to the original message and other users may respond to the responses. The responses may repeat the original message, add links to additional information related to the conversation, and/or provide sentiments regarding the conversation topic.

The analytic system relates the communications together as a conversation, identifies the account and contextual dimension related to the conversation, and then generates analytics for the account based on the conversation.

In operation 170, metadata may be identified that associates social signals with a particular conversation. For example, a social network such as Twitter® may embed tags into signals identifying the message as a re-tweet of a prior Tweet message. In operation 172, the analytic system may assign a same conversation identifier to the original Tweet message and the re-tweet message.

The analytic system may analyze the content of the message to discover signals related to the same conversation. For example, the words used in different messages may be compared in operation 174 and topic clusters may be generated from the matching keywords in operation 176. In operation 178, content in the social signals may be compared with the keywords for the topic clusters. Social signals matching the same topic cluster may be associated with a same conversation. In operation 180, the social signals associated with the same conversation may be assigned a same conversation identifier.

In operation 182, the conversations may be associated with different contextual dimensions. For example, conversations may be associated with different companies, brands, geographic regions, etc. The signals may be assigned additional identifiers identifying the contextual dimension related to the associated conversation.

Figure 5:
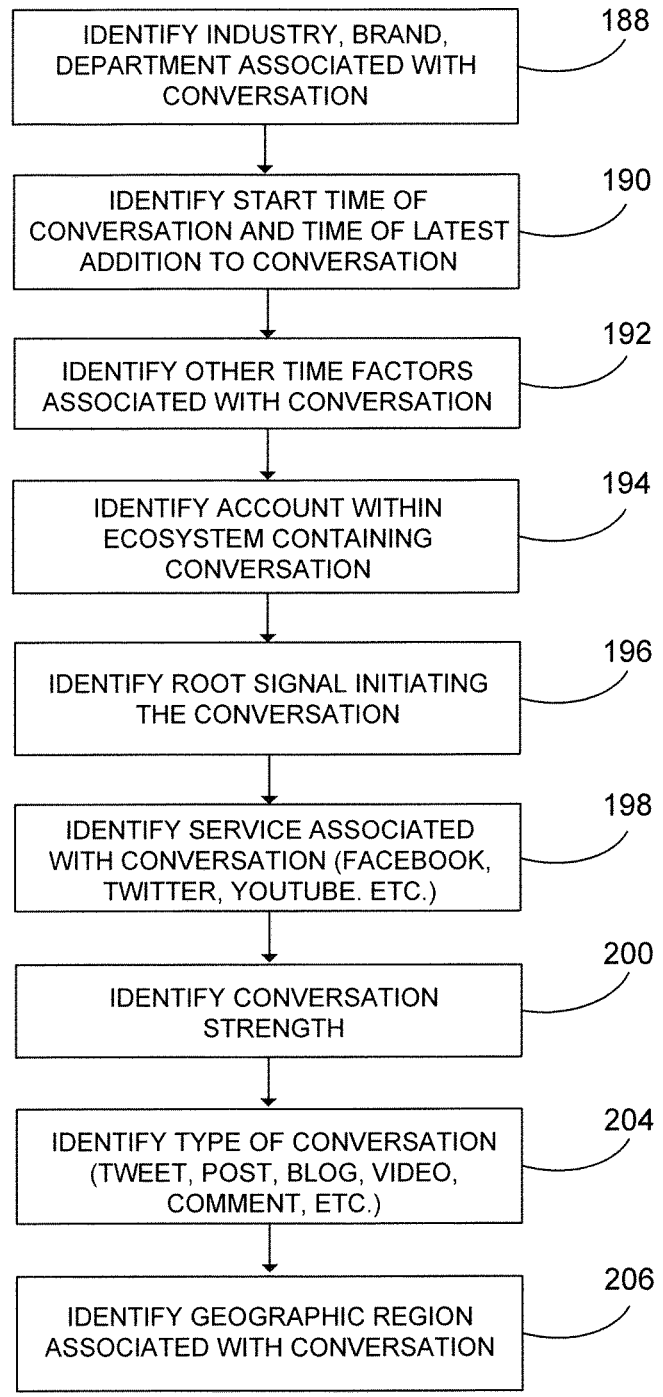
FIG. 5 depicts an example process for associating different parameters with a conversation.

FIG. 5 depicts an example process for associating other metrics with conversations. In operation 188, a contextual dimension may be associated with the conversation. For example, as mentioned above, the conversation may be associated with a company, brand, service, industry, etc.

In operation 190, a start time and a time of a latest addition to the conversation may be identified. In operation 192, other time factors may be identified for the conversation. For example, the number of participants and sentiment of the conversation may be tracked over time.

In operation 194, an account within an ecosystem containing the conversation may be identified. For example, the conversation may be associated with a particular product and the to product may be associated with an account for a particular company. The ecosystem for the company may comprise the explicit followers of the company and all the communications generated within the context of the company accounts that are publicly visible.

In operation 196, a root signal initiating the conversation may be identified. For example, the conversation may spawn from a product announcement sent or posted by a company. Operation 198 may identify the social network service associated with the conversation. For example, the conversation may be conducted on a single social network, such as Twitter® or may extend over different social networks such as Twitter®, Facebook®, and YouTube®.

Operation 200 may identify a strength of the conversation. For example, the analytic system may derive an arithmetic average of the percentiles of average discussion length, company/constituent discussion strengths, total discussions, total signal count, constituent signal counts, and company signal count.

Operation 204 may identify the type of communications used in the conversation, such as posts, blogs, videos, comments, etc. and operation 206 may identify a geographic region associated with the conversation. For example, some of the signals associated with the conversation may include videos and most of the signals associated with the conversation may come from accounts located in the United States.

Figure 6:
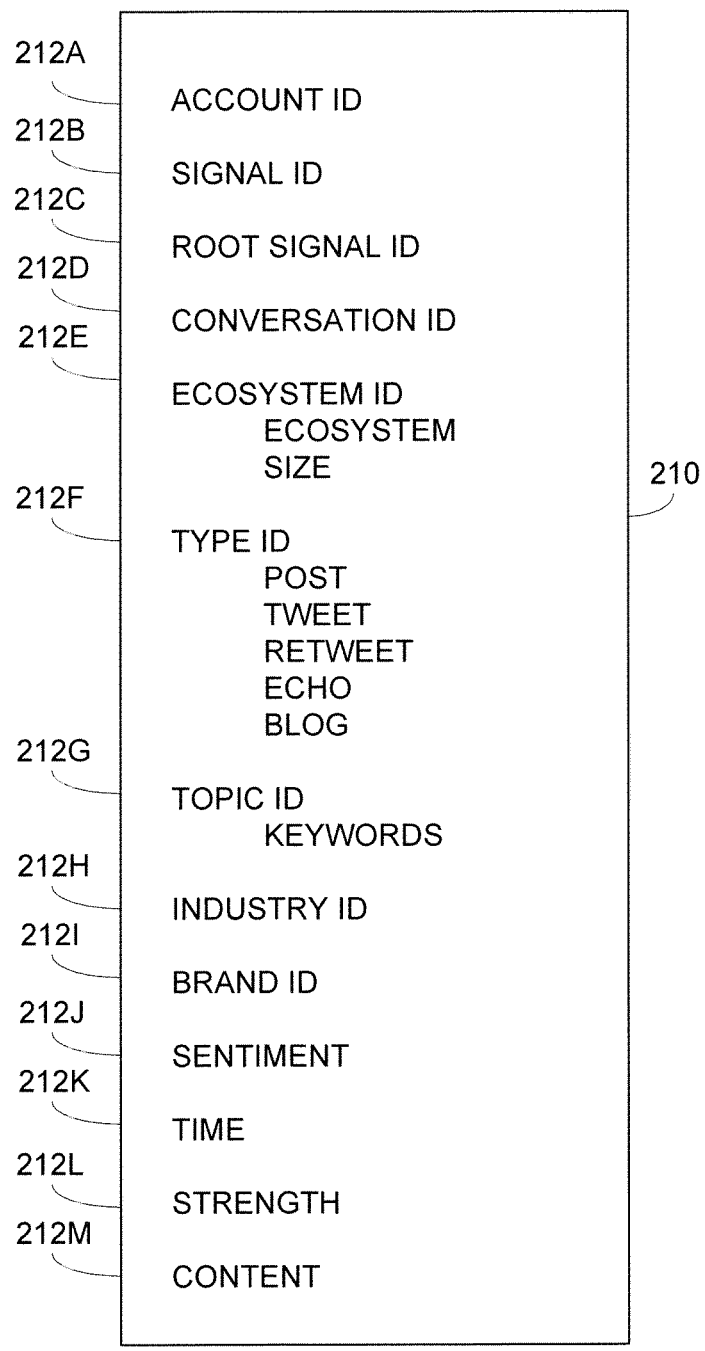
FIG. 6 depicts an example of different contextual dimensions and relationships assigned to a signal.

FIG. 6 depicts an example of the contents of a signal 210 containing contextual dimension and conversation identifiers. An account identifier 212A may identify the account in the analytic system associated with signal 210. A signal identifier 212B provides a unique identifier for signal 210 collected from the social network.

A root signal identifier 212C may identify a signal that started a particular conversation. For example, the root signal may be the message sent or posted by a company announcing a new product release. Conversation identifier 212D may identify the conversation associated with signal 210. For example, signal 210 may be a message commenting resending, viewing, re-tweeting, mentioning, etc. the new product release message associated with root signal identifier 212C.

Ecosystem identifier 212E may identify the ecosystem related to signal 210. As explained above, the analytic system may identify an ecosystem as an account for a company and all of the explicit followers of the company and all the communications generated within the context of the company accounts that are publicly visible. Any account or signals associated with the ecosystem may be assigned a same ecosystem identifier 212E and the number of followers in the ecosystem may be identified.

A type identifier 212F may identify a type of message associated with signal 210. For example, the message contained in signal 210 may be a post, tweet, re-tweet, echo, blog, etc. A topic identifier 212G may comprise a set of keywords identifying a particular topic of the message contained in signal 210. Any topic can be identified but in one example the topic may be related to a company or brand.

An industry identifier 212H may identify a particular industry associated with signal 210. A brand identifier 212I may similarly identify a brand associated with signal 210. Again the industry or brand may be identified from metadata contained in the signal 210 or may be determined from the content of the message contained in signal 210 using machine learning algorithms.

A sentiment 212J may identify a sentiment of the message contained in signal 210. For example, the user generating the message may have assigned a like or dislike sentiment identifier to the message or the content 212M of their communication may be identified by the system to be variously positive, neutral, negative, or otherwise. A time indicator 212K may identify when signal 210 was generated or collected from the social network. Strength value 212L may identify the strength of the conversation based on the number of other signals and the types of constituents participating in the conversation. Content 212M comprises the content of the message contained in signal 210. For example, content 212M may comprise a text message, links, photos, videos, or the like, or any combination thereof.

Figure 7:
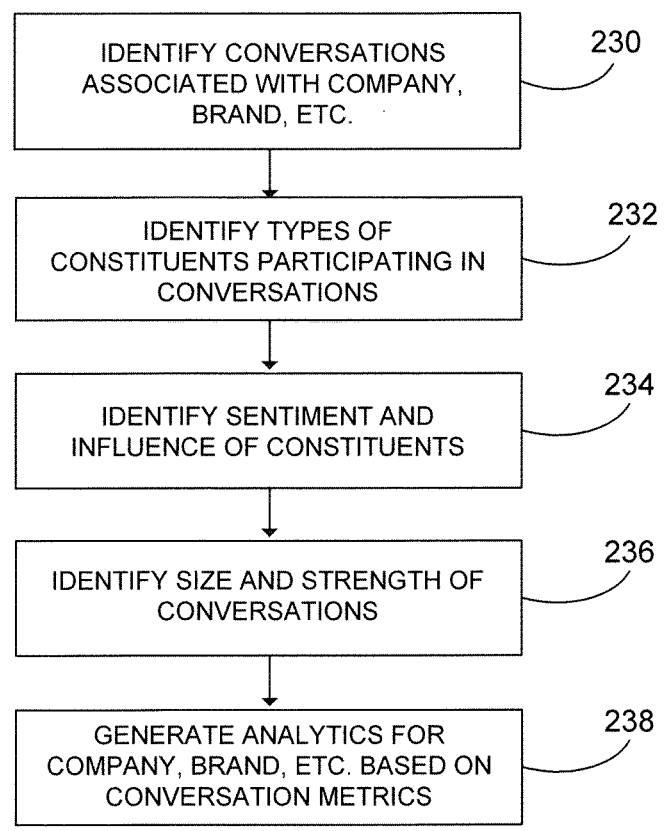
FIG. 7 depicts an example of how analytics may be generated for an account based on an associated conversation.

FIG. 7 depicts one example process for generating analytics for an account based on associated conversations. Again, FIG. 7 shows just one example of any combination of parameters that may be used for generating any type of analytics. In operation 230, the analytic system may identify conversations for an account associated with a particular contextual dimension. For example, the conversation may be related to a particular product.

In operation 232, the analytic system may identify the different types of constituents participating in the conversation. In operation 234, a sentiment and/or influence of the constituents may be identified. As described above, some social networks may allow constituents to attach sentiment ratings to messages. In another example, the analytic system may derive the sentiment ratings from the messages using machine learning algorithms. The sentiments of messages generated by a particular constituent during the conversation may be averaged to determine an overall sentiment for the constituent.

The analytic system may also derive influence values for the constituents. As also mentioned above, the analytic system may identify the number of messages sent or posted by the constituents, the number of followers of the constituents, the number of messages of the constituents resent in other messages, etc. Any combination of these influence factors may be combined to derive influence values for the constituents participating in the conversation.

Operation 236 may determine the size and strength of the conversations. For example, the analytic system may determine an overall size and strength of the conversations based on the number of constituents participating in the conversation, the influence of the constituents participating in the conversation, the number of messages sent during the conversation, etc.

In operation 238, the analytic system may generate analytics for an account based on any of the above conversation metrics. For example, the analytic system may generate a quantitative score for a brand associated with the conversation based on any combination of the types and number of constituents, influence and sentiment of the constituents, and overall size and strength of the conversation about the brand.

Figure 8:
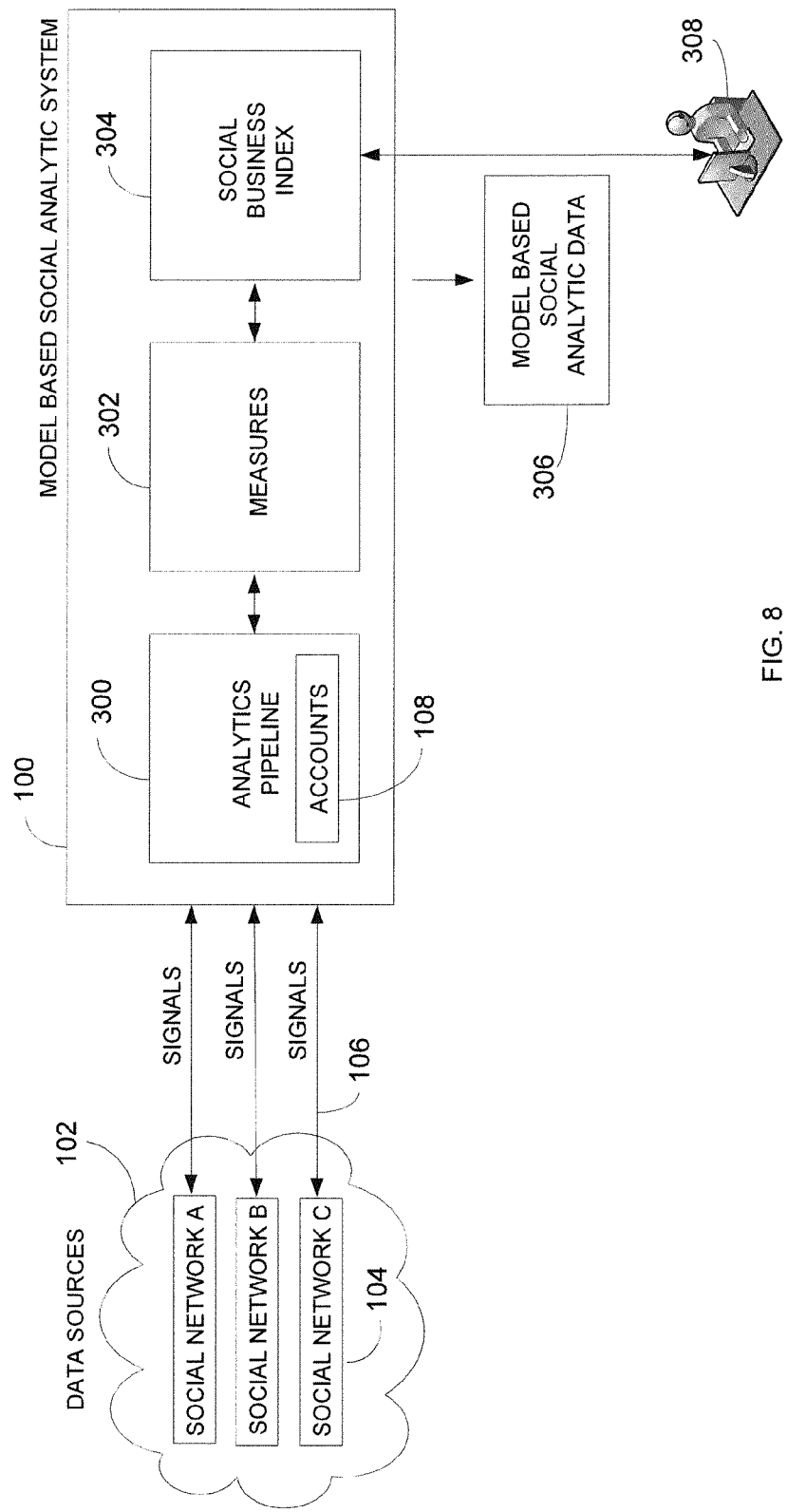
FIG. 8 depicts in more detail an example of a model based social analytic system.

FIG. 8 depicts a more detailed example of the analytic system 100. Analytic system 100 may comprise an array of local and/or cloud-based computing and storage devices, such as servers and database systems for accessing and processing data collected from different social networks 104. A computing device 308, such as a personal computer, computer terminal, mobile device, smart phone, electronic notebook, or the like, or any combination thereof may be used for viewing the analytic data 306 generated by analytic system 100. For example, computing device 308 may access and display analytic data 306 via a web browser or mobile device application. In other embodiments, some or all of analytic data 306 may be generated by computing device 308.

All of the different computing devices within analytic system 100 may be coupled together via one or more buses or networks. Similarly, analytic system 100 may be coupled to social networks 104 and computing device 308 via one or more buses or networks. The busses or networks may comprise local area networks (LANs), wide area networks (WANs), fiber channel networks, Internet networks, or the like, or any combination thereof.

In one example, analytic system 100 may continuously track social performance for thousands of companies and create one or more accounts 108 for each of the companies. As mentioned above, accounts 108 may be associated with accounts on different social networks 104, such as Twitter® accounts, Facebook® accounts, YouTube® accounts, or any other data source where social signals 106 may be generated. The accounts on social networks 104 may be operated by companies, individuals, or any other entity.

The analytics system 100 may assign contextual dimension identifiers to accounts 108 identifying the companies, brands, services, individuals, or any other entity operating the associated accounts in social networks 104. One of accounts 108 associated with a company may be referred to as a company account. The company account 108 may have an associated social graph consisting of other related accounts 108. The set of all accounts 108 related to the company account may be referred to as an ecosystem of the company account. The ecosystem for the company account may comprise both a static social graph and a dynamic social graph.

The static social graph may comprise the set of all accounts 108 that either follow or are followed by the company account and may comprise a statically defined relationship between the accounts. For example, an account 108 associated with a brand or subsidiary of the company account may be identified as having a static relationship with the company account.

The dynamic social graph may be a set of accounts 108 that have interacted with the company account in some way whether or not there is a static relationship. For example, an account 108 may mention in a message the company associated with the company account or may forward a message from the company account.

The ecosystem for the company account also may be delineated based on constituent type. As mentioned above, examples of constituents may include the company itself, employees, partners, advocates, detractors, market, and influencers. For example, employees may be employees of the company, and partners may be distributors, retailers, or subsidiaries having a business relationship with the company. Advocates may be associated with accounts that frequently generate positive messages about the company and detractors may be associated with accounts that frequently generate negative messages about the company.

Influencers may have a relatively large influence on the social network. For example, influencer accounts may have a large number of social network followers. Market may comprise any other accounts that may send, post, or view messages related to the company.

Analytic system 100 may comprise an analytic pipeline 300, a measures module 302, and a social business index module 304. Analytics pipeline 300 may comprise software configured to collect signals 106 from the different social networks 104 associated with accounts 108. Measures module 302 may comprise software configured to generate metrics from the social signal data collected by analytic pipeline 300. Social business index (SBI) 304 may comprise software configured to use the data collected and generated by analytics pipeline 300 and the measures module 302 to display social analytic data 306 identifying social business performance, adoption, and any other social activity. For example, social analytic data 306 may display quantitative scores for different companies, social relationships between brands and their engaged audiences of various constituents, and provide real-time benchmarking for industries, companies, brands, competitors, or geographic regions.

Figure 9:
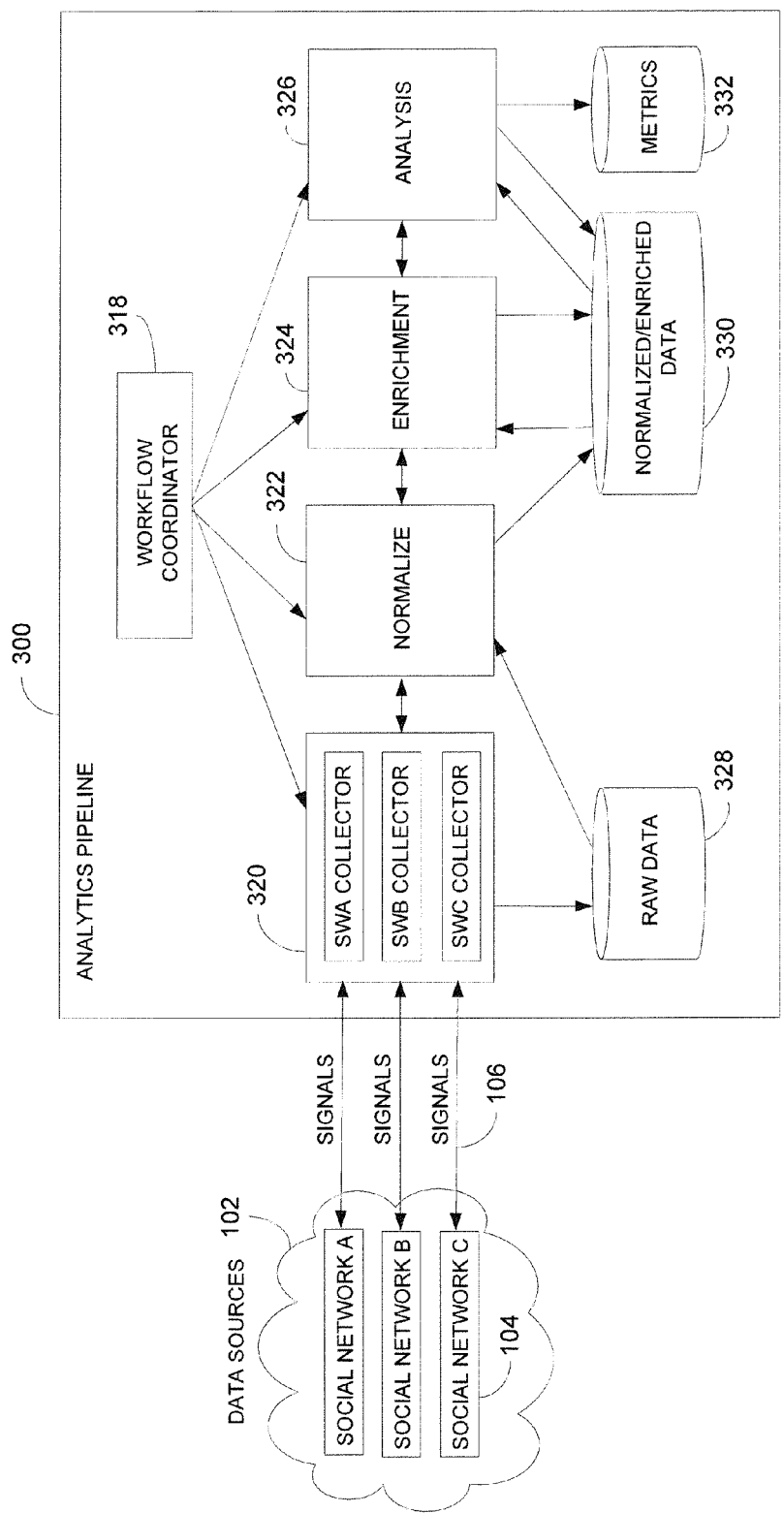
FIG. 9 depicts an example of an analytics pipeline used in the analytic system.

FIG. 9 depicts one example of analytics pipeline 300 in more detail. Multiple collectors 320 are configured to interact with various social networks 104 to collect signals 106. Collectors 320 may collect signals 106 in a native or raw form provided by social networks 104 and store the signals as raw data 328. Signals 106 may comprise the messages generated from the social network accounts and the metadata associated with the messages. For example, the messages may comprise text, audio, video, links sent or posted from a social network account. The messages may be in any format, such as a blog, post, Tweet, etc.

The metadata associated with the messages may identify any static or dynamic relationship between the social network account and other social network accounts on the same network. For example, static relationship data may identify social network accounts for employees, brands, etc. located under a domain for a company network account. As described above, these static account relationships may alternatively be referred to as the static social graph for the company account.

The metadata may also identify dynamic relationships between social network accounts. For example, the metadata in one of signals 106 may indicate the signal mentioned or resent another message from another social network account. As also described above, the dynamic relationship between signals and accounts may be alternatively referred to as the dynamic social graph for the account.

Normalize module 322 may convert raw data 328 into normalized data 330. For example, normalize module 322 may convert the different formats of the messages generated by the different social networks 104 into a generic format and load the content and metadata for the messages into columns of a table. The original format used in the messages may be identified in the table.

Enrichment module 324 may identify or generate additional metadata that identifies contextual dimensions, constituents, and relationships for signals 106. For example, enrichment module 324 may identify signals 106 related to specific brands and may identify signals 106 that form conversations about those brands. Analysis module 326 may generate additional metrics 332 for the normalized/enriched data 330. For example, analysis module 326 may generate a score for an account based on the number and types of conversations and constituents associated with the account.

A workflow coordinator 318 may coordinate the operations performed by the different modules in analytic pipeline 300. For example, workflow coordinator 318 may determine how often collectors 320 collect signals 106 from social networks 104 and when normalize module 322, enrichment module 324, and analysis module 326 process the signals.

Figure 10:
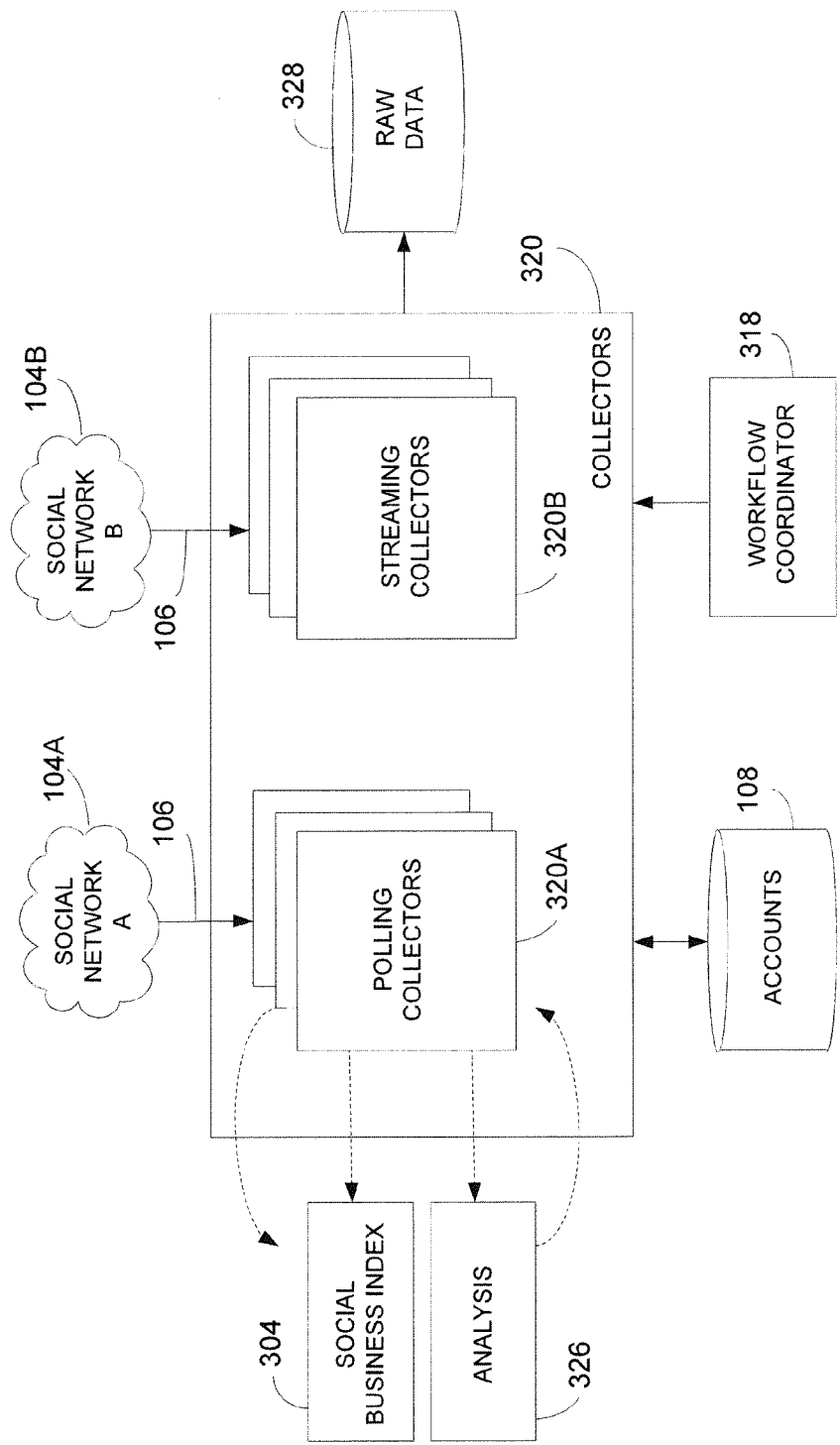
FIG. 10 depicts an example of collectors used in the analytics pipeline.

FIG. 10 shows a more detailed example of collectors 320. Collectors 320 may use application programmers interfaces (APIs) to collect the social signals 106 from the social network accounts within social networks 104. Two different types of collectors 320 may be used. Polling collectors 320A may be used as a client-initiated pulling mechanism to make API calls to associated social networks 104A. In one example, the polling collector 320A may be scheduled by workflow coordinator 318 to run at regular periodic intervals, such as every 15 minutes, 30 minutes, hour, etc.

Streaming collectors 320B may use a server-initiated push mechanism where APIs in social networks 104B continuously push new signals to streaming collectors 320B in realtime. Collectors 320 may operate independently from other processing modules in the analytics pipeline to improve performance.

Collectors 320 may continuously collect social signals 106 for entire industries. For example, collectors 106 may collect social signals 106 from substantially every known social network account operated by car companies. An initial set of seed accounts 108 may be provided to collectors 320 and may identify substantially all of the social network accounts for the different car companies. For example, one of the seed accounts 108 may identify a first account on Facebook® for a car company and a second seed account 108 may identify a second account on Twitter® for the same car company. Seed accounts 108 also may identify social network accounts for different car brands marketed by the car companies. For example:

Seed Account #1=http://Twitter@car company
Seed Account #2=http://Twitter@car company_car brand New accounts 108 may be added to the collection process via social business index (SBI) 304. For example, a user may use a SBI interface to identify a new company account or individual account in a social network for collecting social signals. The new account may be validated by one of collectors 320 and then synchronized into a master list with existing accounts 108.

Analysis module 326 may dynamically identify and add new accounts 108. For example, analysis module 326 may identify messages generated about a product. Some of the signals containing the messages may have come from a social network account that does not currently exist in accounts 108. For example, one of the social network accounts may belong to a company that does not currently have an associated analytic system account 108. In another example, the social network account may be owned by an individual that sends or posts large numbers of messages about products sold by the company.

Analysis module 326 may identify the social network account as a source, influencer or advocate for the company and automatically add a new account 108 to the analytic system that identifies the social network account. Collectors 320 then may start periodically collecting signals from the newly identified social network account.

Figure 11:
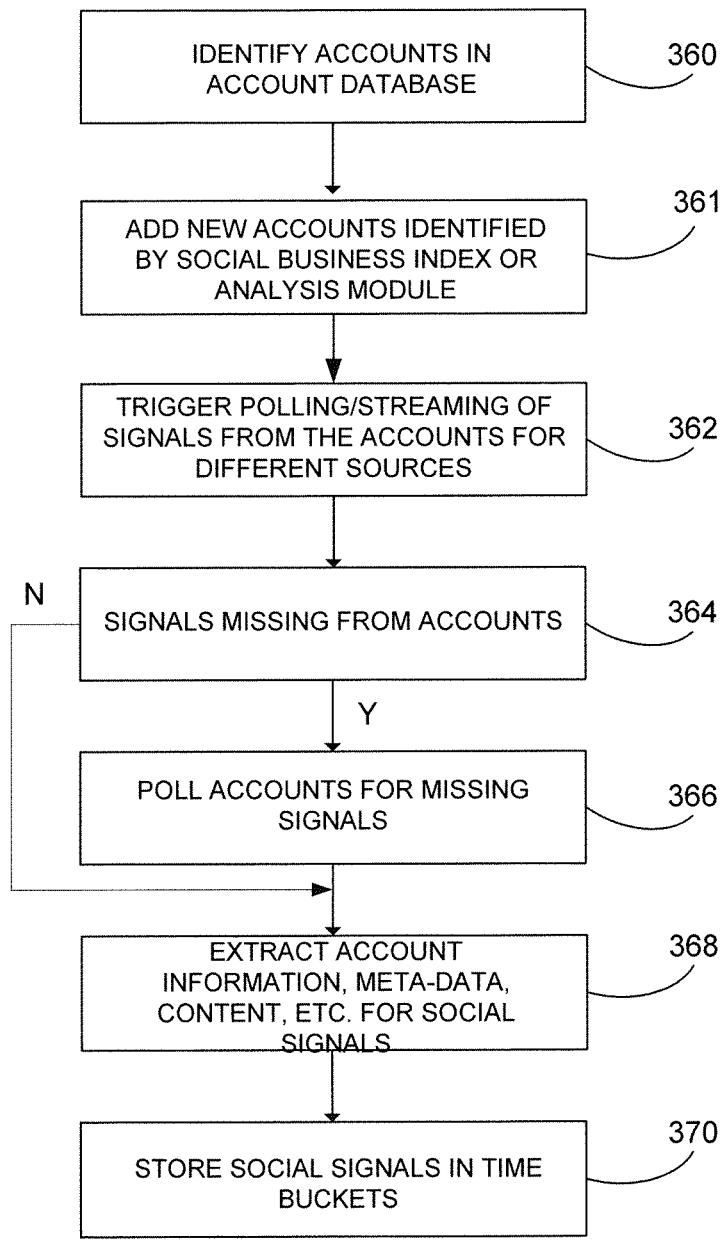
FIG. 11 depicts example process performed by the collectors.

FIG. 11 depicts an example process for the collectors. In operation 360, the collectors identify accounts in an account database of the analytic system for collecting social signals. Some accounts may be provided a priori and used as seed accounts. For example, a company may provide all of the social network accounts associated with their company, all social network accounts for with any products sold by that company, and/or all social network accounts for employees that work for the company.

In operation 361, new accounts may be dynamically added to the existing accounts either manually by users via the social business index interface or automatically by the analytic module. In operation 362, the collectors are triggered to poll signals from the social networks identified by the accounts. For example, some social signals may be collected from the social networks every 15 minutes. Other signals may be continuously streamed from the social networks to the collectors.

In operation 364, some signals may be missing. For example, the servers operating the polling or streaming APIs may temporarily go down or be overloaded and lose connectivity with the collectors. In operation 366, the collectors may automatically poll the social networks for the missing signals.

In operation 368, the collectors may extract all necessary content, account, and meta-data contained in the signals. For example, the collectors may extract the content of the messages that are posted or sent from the account, extract meta-data that identifies the types of messages, and extract account information that identifies the static relationship of the account to other accounts. Operation 370 may store the social signals in time buckets. For example, all of the social signals collected during a particular time period may be assigned to the same time bucket. The time buckets allow the analytic system to generate analytics for any definable time period, such as for a particular hour, day, month, year, etc.

Figure 12:
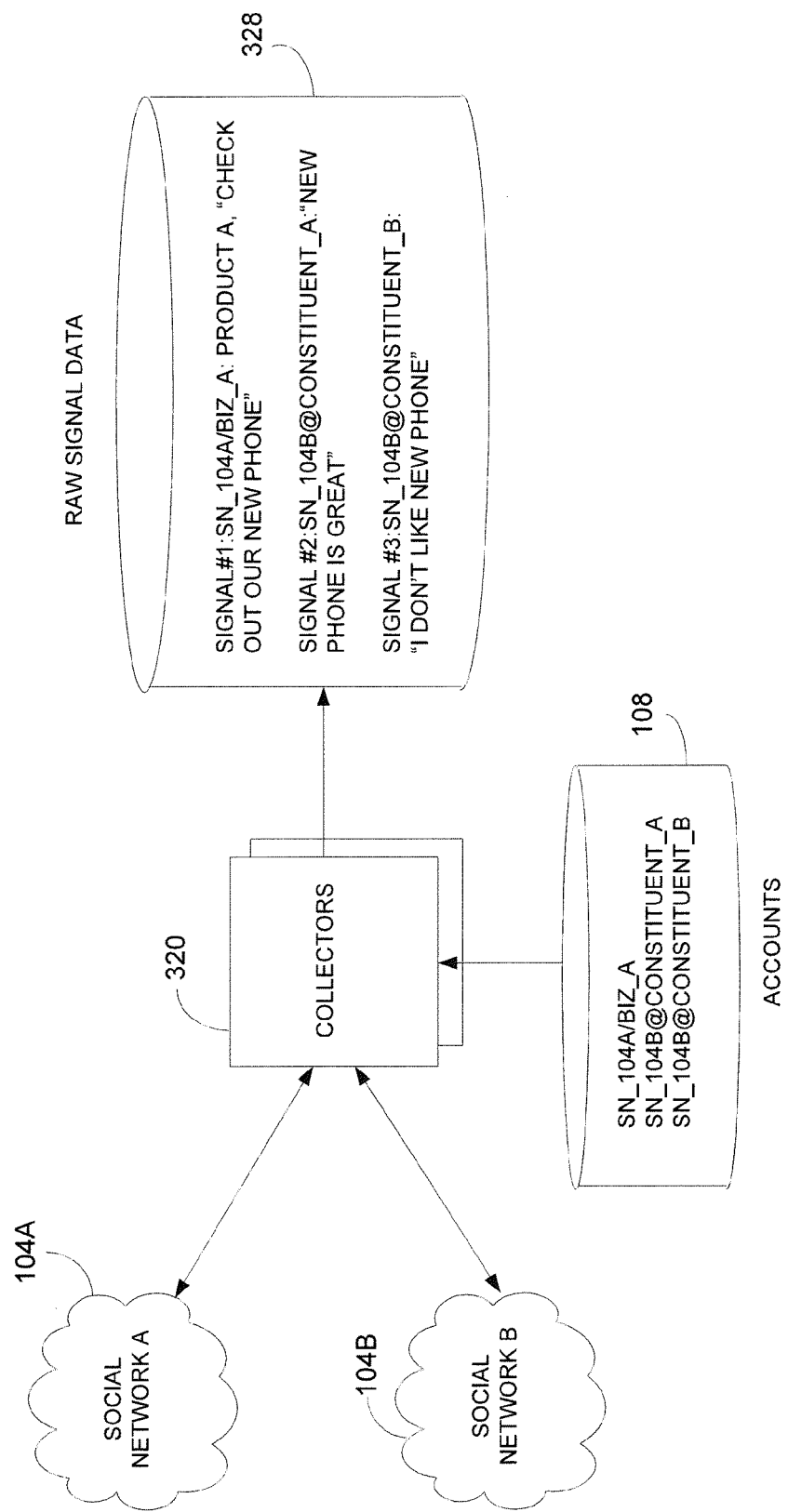
FIG. 12 depicts an example of how signals are collected from social networks.

FIG. 12 depicts another example of how collectors 320 may extract data from the signals generated by different social networks. Accounts 108 may identify a first social network (SN_104A) containing an account for a business A (SN_104A@BIZ_A). Accounts 108 may identify a second social network (SN_104B) containing an account for a constituent A (SN_104B@CONSTITUENT_A) and an account for a constituent B (SN_104B@CONSTITUENT_B).

Collectors 320 collect the signals from the social networks 104A and 104B associated with accounts 108. In one example, collectors 320 may collect a signal #1 that contains a message generated from the social network account of business A announcing the launch of a new phone. Collectors 320 may collect a second signal #2 from the social network account of constituent A providing a favorable review of the new phone. Collectors 320 also may collect a third signal #3 from the social network account of constituent B providing a negative review of the new phone. Collectors 320 may store the contents of signals #1, #2, and #3 as raw signal data 328.

Collectors 320 may also extract metadata associated with the signals. For example, a Tweet message may contain a mention tag identifying the new phone. The collectors extract and store the mention tag with the Tweet message. The analytic system may use the mention tag to associate the signal with a contextual dimension. For example, the mention tag may identify the brand name of the new phone and an associated brand identifier may be assigned to the signal. Similarly, collectors 320 may extract and store hash tags from the messages identifying different contextual dimensions for the signals.

FIG. 13 depicts a conceptual example of normalized signal data generated by the normalize module 322 for the analytic pipeline shown in FIG. 9. This of course is just a small example of different content, metadata, and other parameters that may be extracted from the social signals. Different content and metadata may be extracted from the raw signal data and loaded into associated columns of table 380.

Each column of table 380 may represent a different parameter associated with a signal and each row of table 380 may contain the parameter values for a different signal. For example, column 382A may identify the social network account that posted or sent the message and column 382B may identify the social network account where the message was sent. Field 382B may be null when a message is posted and not sent to a specific network account. Column 382C may identify the social network producing the signal. Column 382D may identify the date and time the signals are generated or collected and column 382E may assign unique identifiers to each signal.

Column 382F may identify the type of message associated with the signal. For example, signal #1 may contain a message posted on a Facebook® account, signal #2 may contain a Tweet message sent from the Twitter® account for constituent A, and signal #3 may contain a re-tweet message sent from the Twitter® account for constituent B. Column 382G may contain the content of the message. For example, column 382G may contain the text messages posted or sent from the different social network accounts.

The normalize module converts the signals from the different social networks into a generic format for easier analytic system processing. However, the normalization process still maintains the signal metadata that may identify static or dynamic relationships with other signals or accounts. For example, the retweet identifier in column 382F may indicate signal #3 contains a previously sent message from signal #2 and therefore may identify signal #2 and signal #3 as being part of the same conversation related to the new phone.

FIG. 14 shows other examples of information that may be extracted from the social signals and loaded into table 380. Again these are just examples of any number of parameters that may be extracted from the social signals.

SIGNAL_ID: A unique identifier for the signal.
TIME: The time the signal was generated.
TIME BUCKET: A monitored time period associated with the signal.
SIGNAL TYPE: POST, REPLY, ECHO.
CONTENT TYPE: Tweet, wall post, blog, forum, video, comment, photo, etc.
SERVICE ACCOUNT ID: Identifier of the account that originated the signal.
ECOSYSTEM ACCOUNT ID: Identifier of the account for an ecosystem containing this signal.
SERVICE: The social network used for generating the signal, such as Twitter®, Facebook®, YouTube®, etc.
URL: The URL for the social network account that generated the signal.
PARENT SIGNAL ID: The identifier of the original signal for a reply or echoed signal.
TAGS: Hash tags tagged to the signal.
LINKS: URL links embedded in the signal.
CONTENT: Content of signal.

Figure 15:
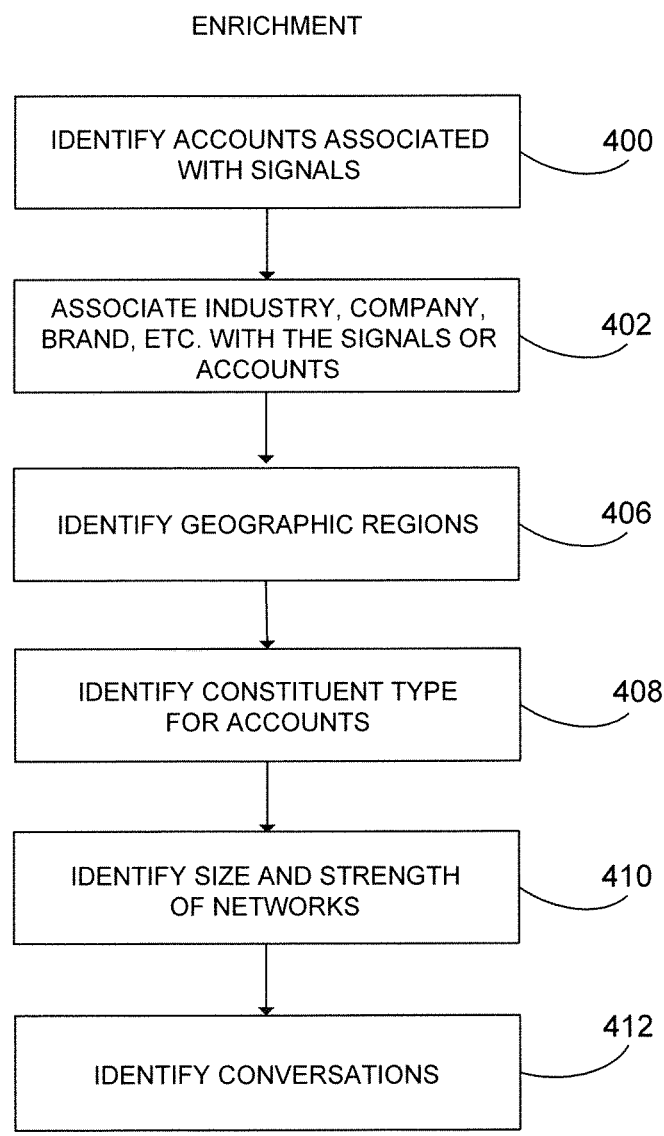
FIG. 15 depicts an example process for enriching signal data with additional metadata.

FIG. 15 depicts an example of a process for enriching normalized signal data. In operation 400, account identifiers are assigned to the collected signals. For example, signals received from a particular social network account may be assigned an account identifier associated with the social network account. In operation 402, contextual dimensions may be assigned to the signals. As discussed above, the analytic system may identify an industry, company, brand, etc. with the account or the signal. For example, the signal may be collected from a social network account associated with a particular car brand sold by a car company. The signal may be assigned an industry identifier associated with the automobile industry, assigned a company identifier associated with the car company, and/or assigned a brand identifier associated with the car brand.

Operation 406 may associate geographic regions with accounts or signals. For example, a social network may include social network accounts for different geographic regions, such as North America, Europe, Asia, etc. The analytic system may assign location identifiers to the accounts and signals identifying the associated geographic regions. The geographic region identifiers provide yet another contextual dimension for generating social analytics.

Operation 408 may identify constituent types associated with the accounts. As discussed above, one account may be associated with a car company and a second account may be associated with an individual who frequently comments on the products produced by the car company. An identifier may be assigned to the individual account identifying the individual account as a particular type of constituent of the car company, such as an advocate, detractor, influencer, market, partner, etc.

Operation 410 may identify a size and/or strength of the networks associated with the contextual dimensions, accounts, signals, etc. For example, the company account may have a number of members, subscribers, employees, followers, etc. The total number of these associations may be counted and identified as the network size for the company account. The number of signals that are sent, posted, received, and/or viewed by on the company account also may be tracked. The network strength for the company account may be derived from the number of signals associated with the account for a give time period, size of the company account, types of constituents associated with the company account, and/or any other parameters that may indicate a robustness of the social interactions for a particular account.

Operation 412 may identify conversations associated with different signals and/or accounts. As explained above, different signals may be associated with a same contextual dimension or topic of conversation and assigned an associated conversation identifier.

Figure 16:
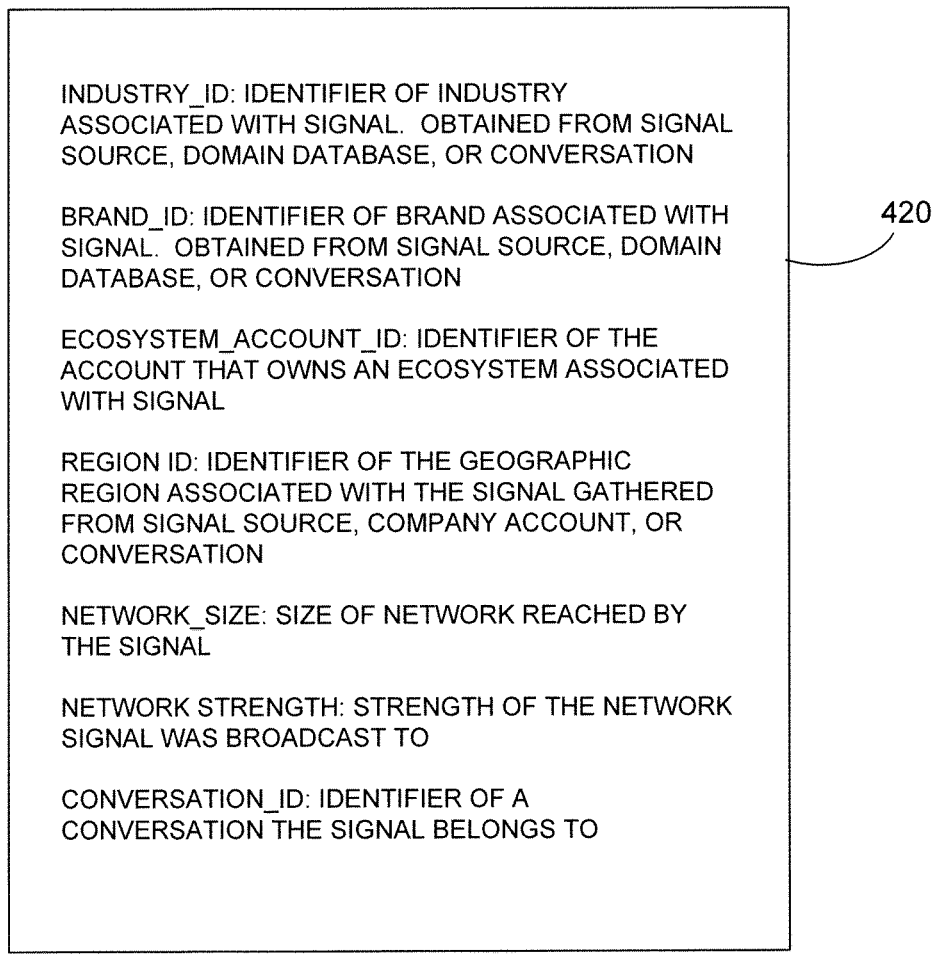
FIG. 16 depicts examples of enriched signal data.

FIG. 16 depicts one example of a table 420 containing some of the metadata described in FIG. 15 that is added to the signals.

INDUSTRY_ID: Identifier of industry associated with signal. The identifier may be obtained from the signal content, a domain database, or from a conversation associated with the signal.
BRAND_ID: Identifier of brand associated with the signal. The identifier may be obtained from the signal source, domain database, or associated conversation.
ECOSYSTEM_ACCOUNT_ID: Identifier of an account that owns an ecosystem associated with a signal. The ecosystem can be any accounts, signals, or contextual dimension associated with the account.
REGION_ID: Identifier of the geographic region associated with the signal. The identifier may be gathered from the signal source, company account, or conversation.
NETWORK_SIZE: Size of network reached by the signal.
NETWORK STRENGTH: Strength of network associated with the signal. For example, a signal broadcast to a network with a large number of subscribers may a larger strength value than a network with fewer subscribers.
CONVERSATION_ID: Identifier of a conversation the signal belongs to.

Figure 17:
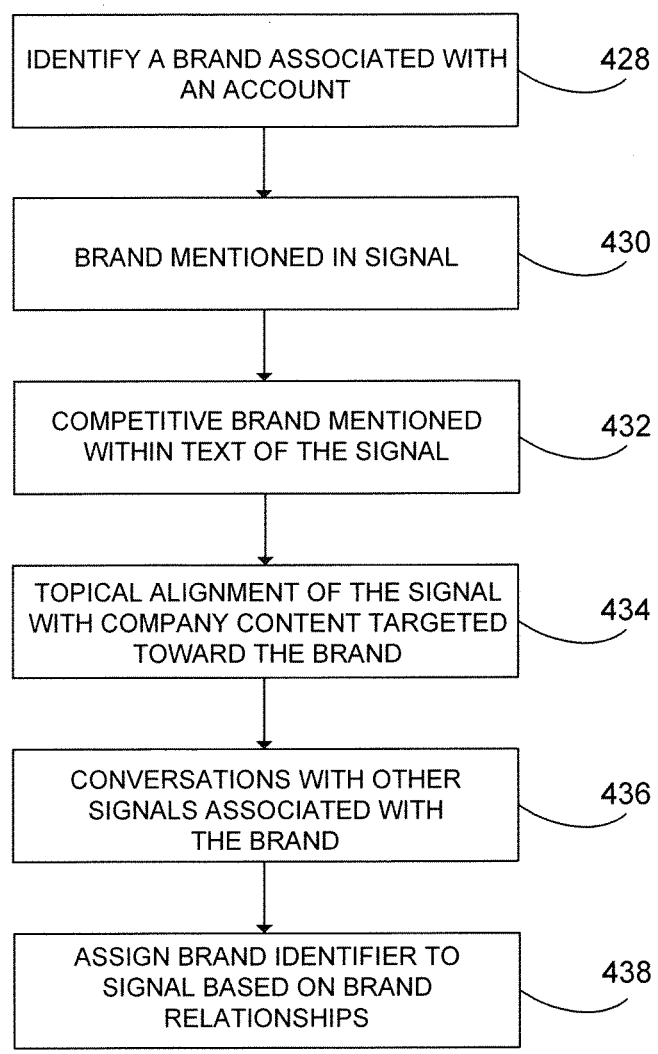
FIG. 17 depicts an example process for identifying a signal associated with a contextual dimension for a brand.

FIG. 17 shows one example of how signals may be associated with a particular brand. This is just one example of how signals can be associated with any contextual dimension. In operation 428, the analytic system may identify a brand associated with a particular account. As discussed above, the brand may be identified and associated with a particular social account based on a priori data provided by a company or the brand may be dynamically derived, discovered, and/or associated with the account by the analytic system. An identifier associated with the brand may be assigned to the account.

In operation 430, the brand may be mentioned in messages contained in the signals. In operation 432, signals may mention competitive brands. For example, a message may compare the brand to other similar competitive brands in a same industry. In operation 434, words in the signal messages may be aligned with company content targeted toward the brand. For example, a topic cluster of keywords may be derived from the social signals generated by the company account that markets the brand. A topic vector for the topic cluster may be compared with the words in other signals.

In operation 436, signals may have previously been associated with the brand or associated with conversations discussing the brand. Other signals that take part in the conversations may be identified as related to the brand. In operation 438, the analytic system may assign the brand identifier to signals having any combination of the brand relationships described above.

FIG. 18 depicts an example of metrics that may be generated by analysis module 326 in FIG. 9. The following are only examples of any variety of metrics that may be generated by the analytic system and added to a metrics table for an account and/or signal.

RATING: Identifies an overall rating for a signal or an account. The rating may be based on a score generated from any combination of metrics.

SIGNAL COUNT: Identifies a number of signals relating to the account for a particular time period. For example, the signal count may identify the number of messages generated for a particular brand within the time period.

RATING_COUNT: Number of ratings received by the account. Some social networks allow users to rate signals, accounts, etc. For example, the users may rate an article or product with a like, dislike, star rating, etc.

LIKES: Number of times the signal was assigned a like or other positive rating.

DISLIKES: Number of times the signal was assigned a dislike or other negative rating.

FAVORITES: The number of times the signal was given a favorite rating.

IMPRESSIONS: The number of times the signal has been viewed.

LISTINGS: The number of times the signal has been added to a signal list.

MENTIONS: The number of times another signal has mentioned by another account or signal.

SENTIMENT: A sentiment score based on sentiment classifiers, such as a negative, neutral, or positive rating assigned to the signal.

Figure 19:
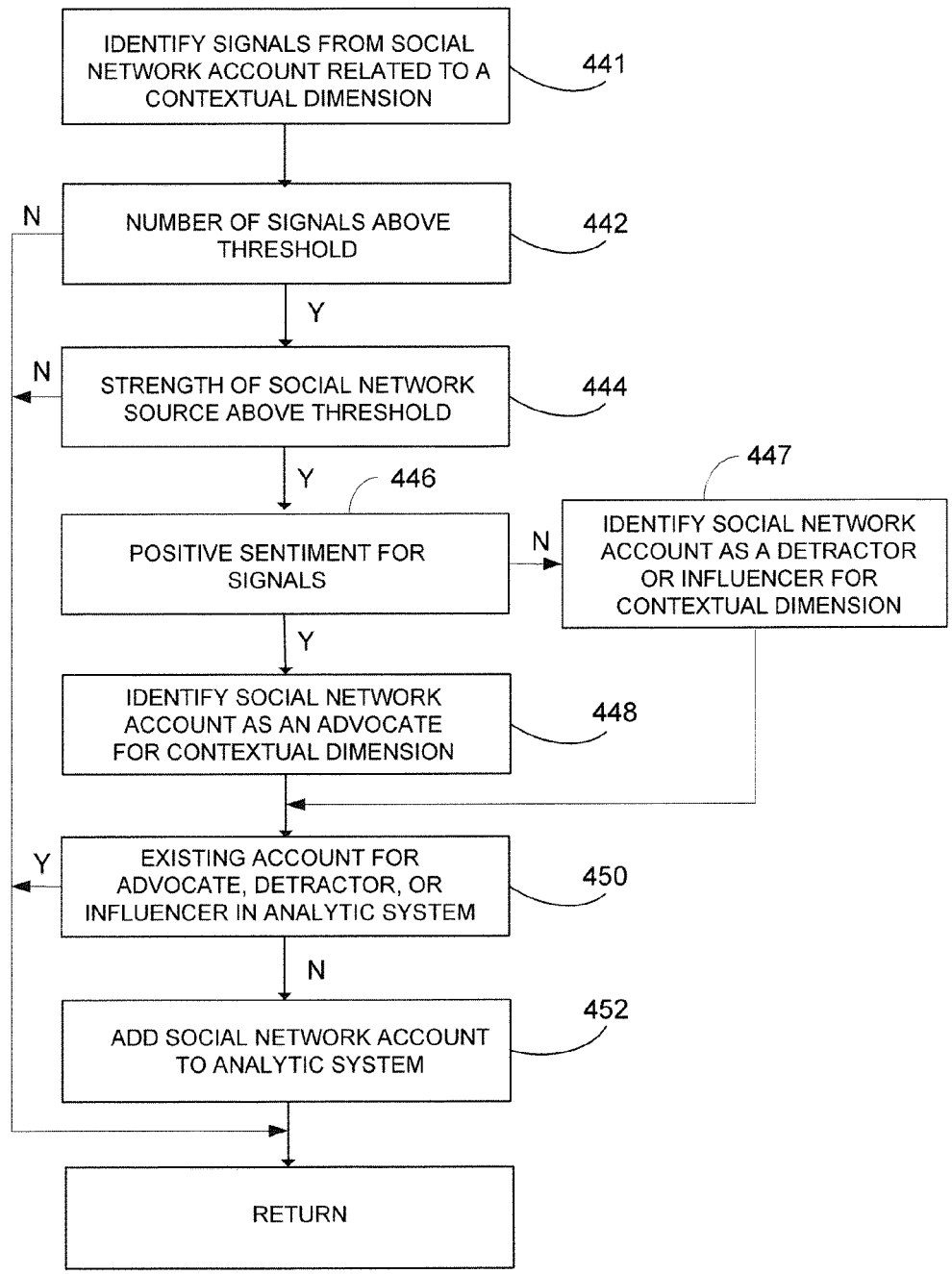
FIG. 19 depicts an example process for dynamically adding accounts to the analytics system.

FIG. 19 depicts one example of how new accounts may be dynamically identified and added to the analytic system. In operation 441, the analysis module may identify signals from a social network account that are related to a particular contextual dimension. For example, the social network account may comprise a Twitter® account that is not currently identified in the analytic system. The analysis module may identify different signals associated with the same conversation. Some of the signals in the conversation may come from the Twitter® account. For example, some signals in the conversation may be replies to signals coming from the Twitter® account.

Operation 442 may determine if the number of signals generated by the Twitter® account is above a first threshold. For example, the analysis module may identify the number of signals generated by the Twitter® account during the conversation or the number of signals that relate to a particular contextual dimension. The Twitter® account might not be added to the analytic system if the number of signals is below the first threshold.

Operation 444 may determine if a strength of the Twitter® account is above a second threshold. For example, the strength may be based on the number of followers for the Twitter® account. The Twitter® account might not be added to the analytic system if the strength of Twitter® account is below the second threshold.

Operation 446 may determine an overall sentiment for the signals from the Facebook® account related to a particular contextual dimension. For example, the analysis module may determine the overall sentiment for messages sent or posted from the Facebook® account that relate to company X. Operation 448 may identify the Facebook® account as an advocate of company X when the messages from the Facebook® account have any overall positive sentiment. Operation 447 may identify the Facebook® account as a detractor of company X when the messages from the Facebook® account have any overall negative sentiment. Operation 448 may identify the Facebook® account as an influencer of company X when the messages from the Facebook® account have a mixed sentiment and the strength of the Facebook® account is above a particular level identified in operation 444.

In operation 450, the analytic system may determine if the Twitter® account currently exists in the analytic system. For example, the analytic system may determine if any of the accounts stored in the analytic pipeline contain the URL for the Twitter® account. If not, the Twitter® account may be added to the analytic system in operation 452. The Twitter® API operated by the collector may be automatically configured to start periodically polling or streaming signals from the Twitter® account.

Thus, the analytic system identifies and adds new accounts that generate the most relevant signals for the contextual dimensions and associated accounts.

Figure 20:
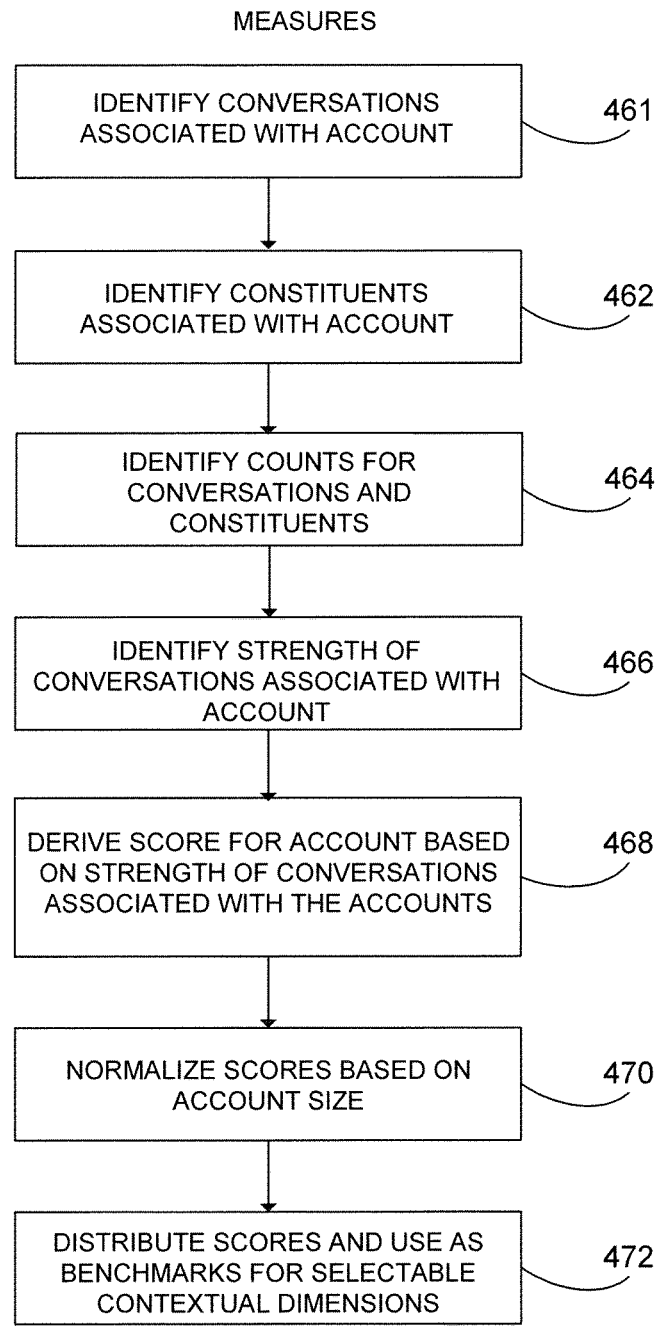
FIG. 20 depicts an example of a process for generating scores for analytic system accounts.

FIG. 20 depicts one example of how scores may be generated for accounts. Again, this is just one example of any number of different scores that may be generated by the analytic system for any account or defined contextual dimension. Operation 461 may identify conversations associated with an account. As previously described, the account may be associated with a brand and the conversations may discuss the brand. Operation 462 may identify constituents associated with the account. As also previously described, accounts participating in the conversations may be identified as advocates, detractors, partners, employees, influencers, or market.

In operation 464, counts may be accumulated for the conversations and the constituents. For example, the counts may include the number of signals in the conversations, the number of conversations for the account, and the number of signals in the conversations associated with each of the different constituents.

In operation 466, the strength of the conversations associated with the account may be determined. For example, the strength of conversations may be based on the number of constituents associated with the conversations, the number of signals generated by each of the constituents, the strength of the constituents, the length of the conversations, the sentiment of the conversations, etc. Some counts may be weighted differently based on other relationship with the account. For example, the count for an influencer constituent may be given a greater weight than the count for a market constituent since the influencer constituent has a relatively larger number of followers.

In operation 468, a score may be derived for the account based on the strength of the conversations associated with the account. In operation 470, the overall score for the account may be normalized with the scores for other accounts. For example, scores may vary based on the size of the accounts. Normalization allows different accounts to be ranked independently of account size.

In operation 472, scores may be distributed, benchmarked, and/or applied to any selectable contextual dimension. For example, the score for an account associated with a particular product may be compared with an overall score for all products in the same industry. The product score also may be compared with scores for competing products or compared other products in similar geographic regions.

In another example, the account may be associated with a car brand and the analytic system may identify durations of different conversations associated with the car brand. The conversation durations for all other car brands may be averaged together to generate an overall average conversation duration for the car industry. The average length of social network conversations in the car industry can then be used as a benchmark and compared to the average conversation duration for the particular car brand associated with the account. The same rollup averaging and comparisons can be performed for competitor brands, geographic regions, or any other definable contextual dimension. Thus, the relationship identifiers and scores derived by the analytic system allow metrics to be distributed and compared over a large number of selectable axes.

Figure 21:
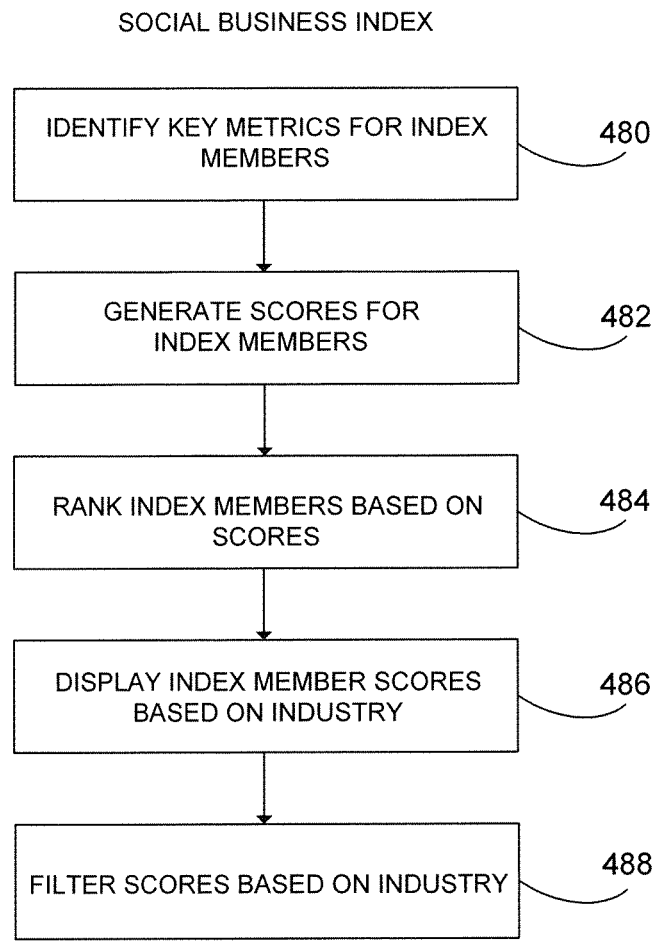
FIG. 21 depicts an example of a process for displaying analytics for different accounts.

FIG. 21 depicts an example process performed by the social business index 304 in FIG. 8. In operation 480, key metrics may be identified for index members. The key metrics are the metrics needed to generate scores for particular contextual dimensions. For example, scores for accounts related to products in a particular industry may use the number of mentions of the accounts, number followers of the accounts, etc. In operation 482, scores may be generated from the metrics for the different index members. For example, scores may be generated for each brand of each company of each industry with accounts in the analytic system.

Operation 484 may rank all index members based on their associated scores. In operation 486, the scores and the rankings may be displayed on a user interface based on industry or any other user definable contextual dimension. In operation 488, the scores may be filtered based on industry, brand, or any other contextual dimension. For example, scores may be ranked and displayed for computer companies or for smart phones.

Figure 22:
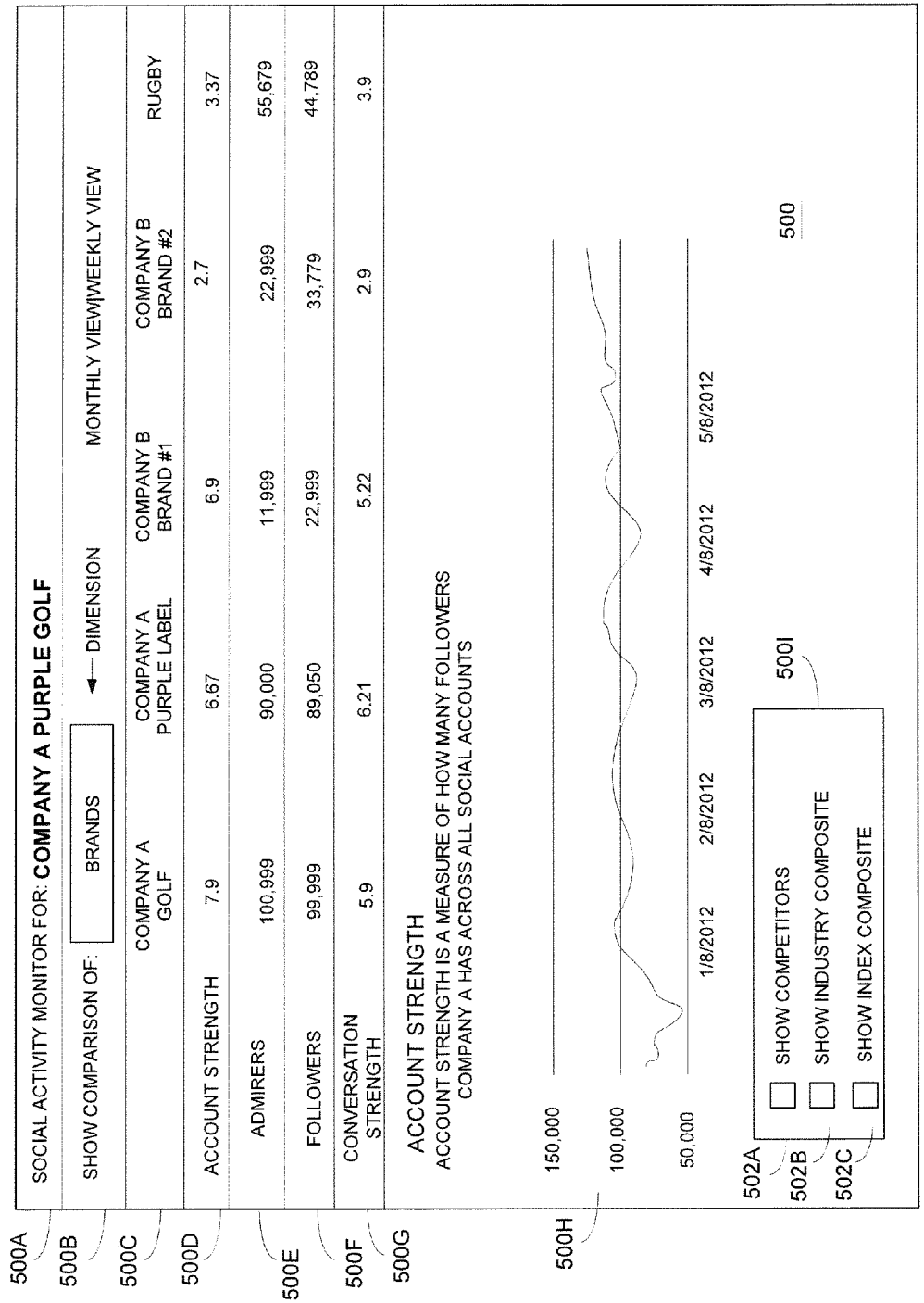
FIG. 22 depicts an example of an electronic page displaying social analytics for the different accounts.

FIG. 22 depicts one example of an electronic page 500 generated by the social business index. A row 500A within electronic page 500 may identify a particular company selected by a user. A row 500B may contain a field for selecting a contextual dimension for providing comparisons. For example, the user may direct the social business index to display metrics for different clothing brands. The comparisons can be displayed for different selectable time periods, such as for a last week or a last month.

Row 500C may display names of the different brands that the social business index is comparing. In one example, a first column identifies metrics for a line of golf clothing sold by company A. A second column may identify a purple label brand sold by company A. A third column may identify a brand #1 sold by a different company B and a fourth column may identify a brand #2 sold by company B. A fifth column may identify a particular clothing product, such as rugby shirts.

Row 500D may identify account strength for the different brands based on any of the previously described metrics. For example, the golf line for company A may have an account strength of 7.9 and brand #2 for company B may have an account strength of 2.7. The account strength provides a quantitative score for the quantity and quality of social signals related to the brands.

Row 500E may identify a count of the number positive signals for the brands. For example, row 500E may identify the number of signals that liked or provided positive ratings for the brand. Row 500F may identify the number of followers for the brand accounts.

Row 500G may identify the overall conversation strengths for the brands as described above. For example, the account for the purple label brand sold by company A may have a conversation strength of 6.21 and the account for brand #2 sold by company B may have a conversation strength of 2.9. As described above, conversation strength may take into account an average discussion length, customer/influencer discussion strength, total discussions, total signal count, influencer signal count, etc.

A graph 500H may display a timeline for the account strength of company A. In one example, the account strength may include a count for the number of followers company A has across all of the social networks and all associated social accounts. This may include the number of followers for all accounts associated with company A including the accounts for any subsidiaries of company A. Graph 500H may display the account strength along a multiple week, month, or year time line.

Section 5001 may provide different selectable fields 502 for displaying other metrics. For example, one field 502A may display metrics for competitor accounts, a field 502B may display an industry composite metric, and a field 502C may display an index composite for all other accounts.

Figure 23:
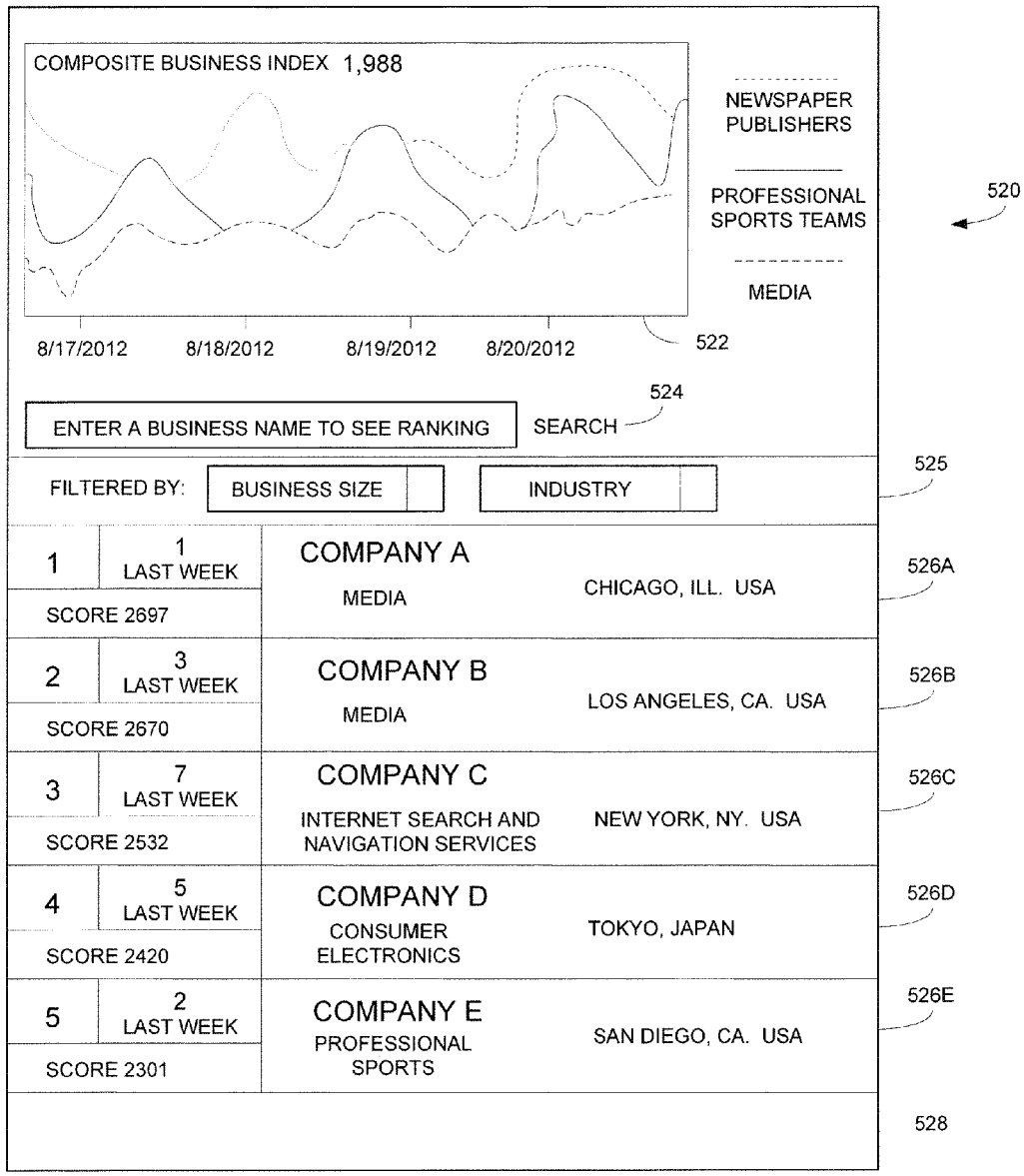
FIG. 23 depicts another example of an electronic page displaying social analytics for the different accounts.

FIG. 23 depicts another example of an electronic page 520 generated by the social business index. A graph 522 may display a timeline of composite business index scores for multiple different industries.

A field 524 allows a user to display the ranking for any particular business. Section 525 allows users to filter rankings based on business size and industry. Sections 526A-526E show the five highest ranked companies, identifies the industries associated with the companies, and shows the previous week rankings for the companies.

Figure 24:
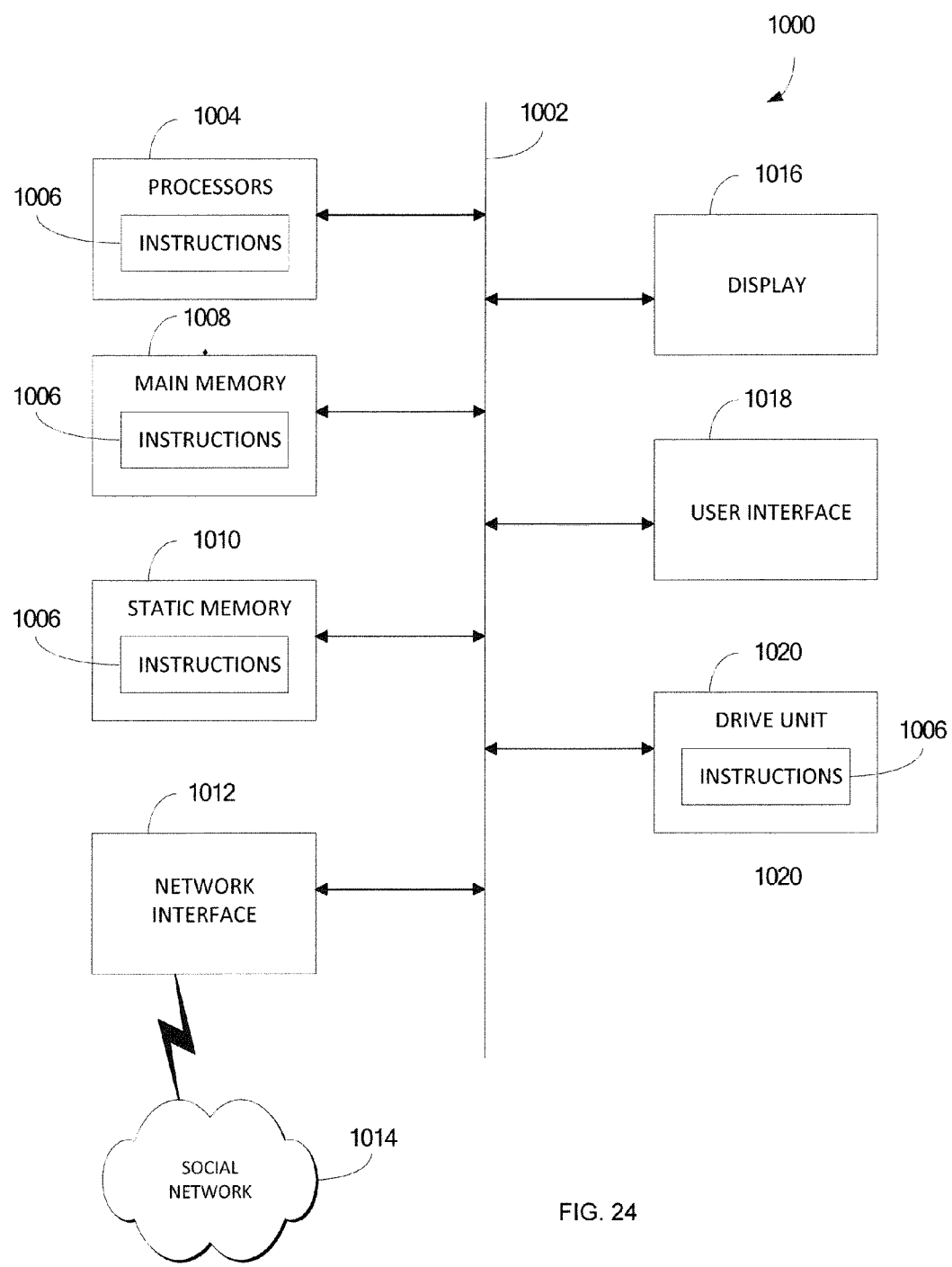
FIG. 24 depicts an example of a computing device used for implementing the analytic system.

FIG. 24 shows a computing device 1000 that may be used for operating the analytic system and performing any combination of the social analytics discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these to functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   identifying accounts associated with social networks;
   collecting signals for the accounts;
   associating contextual dimensions with the accounts;
   identifying relationships between the accounts and/or signals and the contextual dimensions;
   generating analytics for the contextual dimensions based on the relationships;
   identifying the signals containing messages for a conversation discussing a same topic;
   identifying a first type of user participating in the conversation as influencers that have a plurality of followers;
   identifying a second type of user participating in the conversation as advocates;
   determining a first weighted score based at least in part on applying a first weight to a first portion of the messages generated by the influencers;
   determining a second weighted score based at least in part on applying a second weight to a second portion of the messages generated by the advocates;
   calculating a strength of the conversation based at least in part on the first weighted score and the second weighted score;
   generating a score for the topic based at least in part on the strength of the conversation; and
   displaying the score of the topic on a display.

2. The method of claim 1, further comprising identifying a relevance of the signals or accounts to the contextual dimensions and generating the analytics for the contextual dimensions based on the relevance.

3. The method of claim 1, further comprising:
   periodically generating the analytics for the contextual dimensions for different time periods;
   using a first set of the analytics for a first one of the time periods as a benchmark; and
   comparing the first set of analytics to a second set of the analytics for a second one of the time periods to identify changes in the analytics.

4. The method of claim 1, comprising:
   identifying a first set of the signals associated with a first one of the contextual dimensions;
   generating a first set of analytics for the first one of the contextual dimensions from the first set of the signals;
   identifying a second set of the signals associated with a second one of the contextual dimensions;
   generating a second set of analytics for the second one of the contextual dimensions from the second set of the signals;
   using the first set of analytics as a benchmark for comparing with the second set of analytics.

5. The method of claim 4, wherein the first one of the contextual dimensions comprises an industry and the second one of the contextual dimensions comprises a brand within the industry.

6. The method of claim 4, wherein the first one of the contextual dimensions comprises a brand and the second one of the contextual dimensions comprises a competitor brand.

7. The method of claim 4, wherein the first one of the contextual dimensions comprises a company and the second one of the contextual dimensions comprises a brand sold by the company.

8. The method of claim 4, wherein the first one of the contextual dimensions comprises a brand and the second one of the contextual dimensions comprises a geographic region for the brand.

9. The method of claim 1, further comprising:
   identifying the accounts associated with the contextual dimensions as constituents of the contextual dimensions;
   identifying the signals associated with the constituents; and
   generating the analytics for the contextual dimensions based on the signals associated with the constituents of the contextual dimensions.

10. The method of claim 9, further comprising:
identifying the constituents generating positive messages about the associated contextual dimensions as advocates of the contextual dimensions;
identifying the constituents generating negative messages about the associated contextual dimensions as detractors of the contextual dimensions; and
identifying the constituents associated with the contextual dimensions and having a threshold number of followers as influencers of the contextual dimensions.

11. The method of claim 1, further comprising:
identifying the accounts associated with companies as company accounts;
identifying the accounts for employees of the companies as employee accounts; and
generating the analytics for the company accounts based on the signals associated with the employee accounts.

12. The method of claim 1, further comprising:
identifying social network sources associated with the contextual dimensions and having a threshold number of followers as influencers of the contextual dimensions;
adding the social network sources to the accounts; and
collecting signals from the social network sources added to the accounts.

13. The method of claim 1 further comprising:
calculating the strength of the conversation based at least in part on a sentiment of the messages for the conversation, wherein the sentiment includes positive, neutral, and negative reviews in the messages discussing the topic.

14. An analytic system, comprising:
a computing system including a processor configured to execute software instructions stored in memory, the software instructions comprising:
a collector module configured to collect signals from sources in a social network, wherein the sources are identified by accounts;
an enrichment module configured to identify:
relationships between the signals and the accounts;
the signals containing messages for a conversation discussing a same topic;
a first type of user participating in the conversation as influencers that have a plurality of followers; and
a second type of user participating in the conversation as advocates;
an analysis module configured to:
determine a first weighted score based at least in part on applying a first weight to a first portion of the messages generated by the influencers;
determine a second weighted score based at least in part on applying a second weight to a second portion of the messages generated by the advocates;
calculate a strength of the conversation based at least in part on the first weighted score and the second weighted score;
generate a score for the topic based at least in part on the strength of the conversation; and
a display module configured to display the score of the topic on a display device.

15. The analytic system of claim 14, further comprising multiple collector modules configured to collect the signals from different social networks and store the collected signals into time buckets, wherein some of the signals are collected by the collector modules polling the social networks and some of the signals are collected by the social networks streaming the signals to the collector modules.

16. The analytic system of claim 14, further comprising a normalize module configured to load data from the signals into a table and add identifiers to the signals identifying the accounts associated with the signals and identifying ecosystems for the accounts.

17. The analytic system of claim 14, wherein the enrichment module is further configured to identify contextual dimensions associated with the accounts.

18. The analytic system of claim 17, wherein the contextual dimensions comprise at least one of an industry associated with the accounts, a company associated with the accounts, brands or services associated with the accounts, and/or geographic regions associated with the accounts.

19. The analytic system of claim 17, wherein the enrichment module is further configured to identify some of the accounts as constituent accounts for other related accounts.

20. The analytic system of claim 19 wherein the constituent accounts comprise at least one of:
advocate accounts generating positive messages for the related accounts;
employee accounts for employees of companies associated with the related accounts;
partner accounts for the accounts of business partners of the companies associated with the related accounts;
market accounts having some interactions with the related accounts; and/or
influencer accounts having some interactions with the related accounts and having a threshold number of followers or subscribers.

21. The analytic system of claim 14, wherein the enrichment module is further configured to identify the signals associated with same conversations.

22. The analytic system of claim 21, wherein the enrichment module is further configured to:
identify the signals initiating the conversations;
identify types of messages used in the signals associated with the conversations;
identify contextual dimensions associated with the conversations; and
identifying a sentiment for the conversations.

23. The analytic system of claim 22, wherein the contextual dimensions comprise at least one of an industry, a company, a brand, and/or a geographic region associated with the conversation.

24. The analytic system of claim 14, wherein the analysis module is further configured to:
identify a social network source generating some of the signals;
identify the social network source has having a large number of subscribers; and
direct the collector module to add the social network source to the accounts and start collecting signals from the social network source.

* * * * *